US012640445B2

(12) United States Patent
Wakimoto

(10) Patent No.: US 12,640,445 B2
(45) Date of Patent: May 26, 2026

(54) BATTERY AND MANUFACTURING METHOD THEREOF

(71) Applicant: PRIME PLANET ENERGY & SOLUTIONS, INC., Tokyo (JP)

(72) Inventor: Ryoichi Wakimoto, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 0 days.

(21) Appl. No.: 17/515,738

(22) Filed: Nov. 1, 2021

(65) Prior Publication Data

US 2022/0140452 A1 May 5, 2022

(30) Foreign Application Priority Data

Nov. 5, 2020 (JP) ................................. 2020-185188

(51) Int. Cl.
*H01M 50/538* (2021.01)
*H01M 10/04* (2006.01)
(Continued)

(52) U.S. Cl.
CPC ..... *H01M 50/538* (2021.01); *H01M 10/0431* (2013.01); *H01M 50/186* (2021.01); *H01M 50/35* (2021.01); *H01M 50/593* (2021.01)

(58) Field of Classification Search
CPC .. H01M 50/538; H01M 50/186; H01M 50/35; H01M 50/593; H01M 50/543; H01M 50/474; H01M 50/477; H01M 50/183; H01M 50/30; H01M 50/176; H01M 50/59; H01M 50/536; H01M 50/586;
(Continued)

(56) References Cited

U.S. PATENT DOCUMENTS

2011/0067227 A1    3/2011   Sohn
2012/0052341 A1*   3/2012   Kim ...................... H01M 10/42
                                                      429/186
(Continued)

FOREIGN PATENT DOCUMENTS

CN          102386435 A       3/2012
CN          102610828 A       7/2012
(Continued)

OTHER PUBLICATIONS

Espacenet machine translation of WO-2020110178-A1 (Year: 2020).*
Notice of Reasons for Refusal dated Mar. 16, 2023, issued in JP Application No. 2020-185188.

*Primary Examiner* — Susan D Leong
(74) *Attorney, Agent, or Firm* — Finnegan, Henderson, Farabow, Garrett and Dunner, LLP

(57) ABSTRACT

A battery disclosed herein includes an exterior body, a sealing plate sealing an opening of the exterior body, electrode bodies each including a first electrode, an electrode tab group electrically connected to the first electrodes, a terminal attached to the sealing plate and electrically connected to the electrode tab group, a collecting unit electrically connecting the electrode tab rid the terminal, and an insulating member insulating the sealing plate and the collecting unit from each other. The insulating member includes a base portion disposed between the sealing plate and the collecting unit, and protrusion portions protruding, from the sealing plate toward the sides of the electrode bodies.

17 Claims, 12 Drawing Sheets

(51) Int. Cl.
*H01M 50/186* (2021.01)
*H01M 50/35* (2021.01)
*H01M 50/593* (2021.01)

(58) Field of Classification Search
CPC ............. H01M 50/209; H01M 50/531; H01M
10/0431; H01M 10/0525; H01M 10/0587;
Y02P 70/50; Y02E 60/10
See application file for complete search history.

(56) References Cited

U.S. PATENT DOCUMENTS

| | | | |
|---|---|---|---|
| 2012/0189889 A1 | 7/2012 | Kim | |
| 2015/0364732 A1 | 12/2015 | Kim | |
| 2016/0099445 A1* | 4/2016 | Park | H01M 10/0431 |
| | | | 429/82 |
| 2016/0336574 A1* | 11/2016 | Guen | H01M 50/172 |
| 2017/0025669 A1* | 1/2017 | Urano | H01M 50/574 |
| 2018/0097207 A1 | 4/2018 | Unno et al. | |
| 2018/0375162 A1* | 12/2018 | Wakimoto | H01M 50/553 |
| 2020/0194741 A1 | 6/2020 | Shinoda et al. | |
| 2020/0295339 A1* | 9/2020 | Kwak | H01M 10/0431 |
| 2022/0069359 A1 | 3/2022 | Yamada et al. | |

FOREIGN PATENT DOCUMENTS

| | | | | |
|---|---|---|---|---|
| CN | 105280874 A | 1/2016 | | |
| CN | 107534115 A | 1/2018 | | |
| CN | 109119667 A | 1/2019 | | |
| CN | 111095644 A | 5/2020 | | |
| CN | 111682250 A | 9/2020 | | |
| EP | 2 958 162 A1 | 12/2015 | | |
| EP | 3 709 422 A1 | 9/2020 | | |
| EP | 3 902 047 A1 | 10/2021 | | |
| JP | S 39003051 Y | 2/1964 | | |
| JP | 2009-289611 A | 12/2009 | | |
| JP | 2011-065981 A | 3/2011 | | |
| JP | 2012-156134 A | 8/2012 | | |
| JP | 2013-093160 A | 5/2013 | | |
| JP | 5365855 82 | 12/2013 | | |
| JP | 2017-050069 A | 3/2017 | | |
| JP | 2019-046671 A | 3/2019 | | |
| WO | WO-2015076183 A1 * | 5/2015 | ........ | H01M 10/0413 |
| WO | WO 2015/093288 A1 | 6/2015 | | |
| WO | WO 2016/185867 A1 | 11/2016 | | |
| WO | WO 2019/093333 A1 | 5/2019 | | |
| WO | WO 2020/129881 A1 | 6/2020 | | |
| WO | WO-2020110178 A1 * | 6/2020 | .......... | H01M 50/103 |

* cited by examiner

BATTERY AND MANUFACTURING METHOD THEREOF

CROSS-REFERENCE TO RELATED APPLICATIONS

The application is based on Japanese Patent Application No. 2020-185188 filed on Nov. 5, 2020, the content of which is incorporated herein by reference.

BACKGROUND OF THE INVENTION

1. Field of the Invention

The present teaching relates to a battery and a manufacturing method thereof.

2. Description of the Related Art

A battery such as a lithium ion secondary battery generally includes an electrode body including an electrode, an exterior body including an opening and accommodating the electrode body, a sealing plate sealing the opening of the exterior body, and a terminal electrically connected to the electrode inside the exterior body and extending from the sealing plate to the outside of the exterior body. In such a type of battery, a configuration, in which an electrode tab group including a plurality of tabs for current collecting is provided in the electrode and the electrode is connected to a terminal through the electrode tab group, is known. For example, Japanese Patent Application Publication No. 2017-50069 discloses a battery in which a positive electrode tab group is provided at one end of an electrode body in a width direction, and a negative electrode tab group is provided at the other end.

SUMMARY

When a battery is used, vibration, an impact or the like may be applied to the battery from the outside. A tab constituted by, for example, a portion of a collector is soft and susceptible to external forces. For this reason, when an electrode body deviates from a predetermined arrangement position due to an external force and moves toward a sealing plate, an electrode tab group (a positive electrode tab group and/or a negative electrode tab group) may be damaged. As a result, there is a concern that electrical connection between an electrode and a terminal may become unstable or defective connection may occur.

The present teaching is contrived in view of the above-described circumstances, and an object thereof is to provide a battery in which an electrode tab group is not easily damaged and conduction reliability is improved, and a manufacturing method thereof.

According to the present teaching, there is provided a battery including an exterior body that includes a bottom wall, a pair of first side walls extending from the bottom wall and facing each other, a pair of second side walls extending from the bottom wall and facing each. other, and an opening facing the bottom wall, a sealing plate that seals the opening of the exterior body, one or a plurality of electrode bodies that are accommodated in the exterior body and include a first electrode and a second electrode insulated from the first electrode, an electrode tab group that includes a plurality of tabs protruding at ends, in a first direction along the first side walls, of the electrode bodies and is electrically connected to the first electrode, a terminal that is attached to the sealing plate and electrically connected to the electrode tab group, a collecting unit that electrically connects the electrode tab group and the terminal, and an insulating member that insulates the sealing plate and the collecting unit from each other, wherein the insulating member includes a base portion that is disposed between the sealing plate and the collecting unit, and one or a plurality of protrusion portions that are provided further toward a center in the first direction than the base portion and protrude from the sealing plate toward the electrode bodies.

The insulating member includes the protrusion portions that protrude further toward the electrode bodies at the center than the base portion. Thereby, even when vibration, an impact, or the like is applied during the use of the battery, the electrode bodies are not likely to move greatly toward the sealing plate. For this reason, the electrode tab group is relatively less likely to be damaged as compared to a case where the insulating member is not provided. Thus, it is possible to stably maintain electrical connection between the first electrode and the terminal and improve conduction reliability of the battery. In addition, it is possible to prevent the electrode bodies from being damaged due to coming into contact with pans provided in the sealing plate (for example, the terminal).

In a preferred aspect of the battery disclosed herein, the protrusion portions of the insulating member do not abut on the electrode body. The protrusion portions are disposed at positions apart from the electrode bodies, and thus it is possible to prevent the electrode bodies from being damaged due to rubbing between the protrusion portions and the electrode bodies even when vibration, an impact, or the like is applied during the use of the battery.

In a preferred aspect of the battery disclosed herein, the electrode body is a winding electrode body that is laminated in a state where the first electrode having a band shape and the second electrode having a band shape are insulated from each other, and is wound around a winding axis, the winding electrode body is accommodated in the exterior body so that the winding axis is parallel to the first direction, and a shortest distance between the winding electrode body and the protrusion portion of the insulating member is within 5 mm. By setting the shortest distance to a predetermined value or less, it is possible to more effectively prevent the electrode bodies from being moved greatly toward the sealing plate. In addition, when the winding axis is disposed in parallel with the first direction, it is possible to prevent the end faces of the electrode bodies (in other words, a lamination surface on which the first electrode and the second electrode are laminated) from being pressed by the protrusion portions even when the electrode bodies are moved toward the sealing plate due to vibration, an impact, or the like applied daring the use of the battery.

In a preferred aspect of the battery disclosed herein, the protrusion portion of the insulating member includes a pair of first vertical walls that extend in the first direction and protrude from the sealing plate toward the electrode body, and a lower horizontal wall that extends in the first direction and connects ends of the pair of first vertical walls on the side of the electrode body. Thereby, it is possible to effectively reduce a load applied to the electrode tab group even when the electrode bodies are moved toward the sealing plate due to vibration, an impact, or the like applied during the use of the battery.

In a preferred aspect of the battery disclosed herein, the insulating member includes the plurality of protrusion portions that arc arranged in a second direction intersecting the first direction, and an upper horizontal wall that extends in the first direction and connects ends of the first vertical walls of the adjacent protrusion portions. Thereby, it is possible to effectively reduce a load applied to the electrode tab group even when the electrode bodies, are moved toward the sealing plate due to vibration, an impact, or the like applied during the use of the battery.

In a preferred aspect of the battery disclosed herein, the protrusion portion of the insulating member further includes a second vertical wall that connects the pair of first vertical walls and the lower horizontal wall to the base portion. Thereby, it is possible to effectively reduce a load applied to the electrode tab group even when the electrode bodies are moved toward the sealing plate due to vibration, an impact, or the like applied during the use of the battery.

In a preferred aspect of the battery disclosed herein, the sealing plate is provided with a gas exhaust valve, and a gas flow path space which is surrounded by the first vertical wall of the protrusion portion and the electrode body and communicates with the gas exhaust valve is provided. Thereby, a gas generated inside the exterior body easily moves toward the gas exhaust valve, and thus it is possible to smoothly operate the gas exhaust valve. In addition, the generated gas can be efficiently discharged from the gas exhaust valve.

In addition, according to the present teaching, there is provided a method of manufacturing a battery including an exterior body that includes a bottom wall, a pair of first side walls extending from the bottom wall and facing each other, a pair of second side walls extending from the bottom wall and facing each other, and an opening facing the bottom wall, a sealing plate that seals the opening of the exterior body, one or a plurality of electrode bodies that are accommodated in the exterior body and include a first electrode and a second electrode insulated from the first electrode, an electrode tab group that includes a plurality of tabs protruding at ends, in a first direction along the first side walls, of the electrode bodies and is electrically connected to the first electrode, a terminal that is attached to the sealing plate and electrically connected to the electrode tab group, a collecting unit that electrically connects the electrode tab group and the terminal, and a spacer that is disposed between the sealing plate and the electrode body, the method including; a push-in step for pushing the electrode body into the exterior body with the spacer; and a sealing step for sealing the opening of the exterior body with the sealing plate.

In the manufacturing method, the spacers abut on the electrode bodies, and the electrode bodies are pushed into the exterior body. Thereby, a load applied to the electrode tab group can be effectively reduced by avoiding the concentration of stress. Thus, the electrode bodies can be stably inserted into the exterior body. In addition, it is possible to prevent the electrode bodies from being damaged due to coming into contact with parts provided in the sealing plate (for example, the terminal).

In a preferred aspect of the manufacturing method disclosed herein, after the sealing step is performed, the spacer does not abut on the electrode body. Thereby, it is possible to prevent the electrode bodies from being damaged due to rubbing between the spacers and the electrode bodies even when vibration, an impact, or the like is applied during the use of the battery.

In a preferred aspect of the manufacturing method disclosed herein, after the sealing step is performed, a shortest distance between the electrode body and the spacer is within 5 mm. Thereby, when the electrode bodies are pushed into the exterior body, the electrode bodies and the spacers can be more effectively made to abut on each other, and the electrode bodies can be more stably inserted into the exterior body.

In a preferred aspect of the manufacturing method disclosed herein, an insulating member including a base portion and one or a plurality of protrusion portions is provided, the base portion being disposed between the sealing plate and the collecting unit, and the one or plurality of protrusion portions being provided further toward a center in the first direction than the base portion and protruding toward the electrode bodies, and the protrusion portion of the insulating member constitutes the spacer. Thereby, it is possible to effectively reduce a load applied to the electrode lab group.

DETAILED DESCRIPTION OF THE PREFERRED EMBODIMENTS

Hereinafter, some preferred embodiments of a technique disclosed herein will be described with reference to the drawings. Meanwhile, matters other than those particularly mentioned in the present specification and necessary for implementing the present invention (for example, general configurations and manufacturing processes of a battery which do not characterize the present invention) can be ascertained as a design matter of one skilled in the art based on the related art. The present invention can be implemented on the basis of the content disclosed in the present specification and common general terminal knowledge in the art.

Meanwhile, in the present specification, "battery" is a term that refers to a general storage device capable of extracting electric energy, and refers to a concept that includes a primary battery and a secondary battery. In the present specification. "secondary battery" is a term that refers to a general power storage device capable of being repeatedly charged and discharged, and refers to a concept that includes a so-called storage battery (chemical battery) such as a lithium ion secondary battery or a nickel hydrogen battery, and a capacitor (physical battery) such as an electric double layer capacitor.

Battery 100

Figure 1:
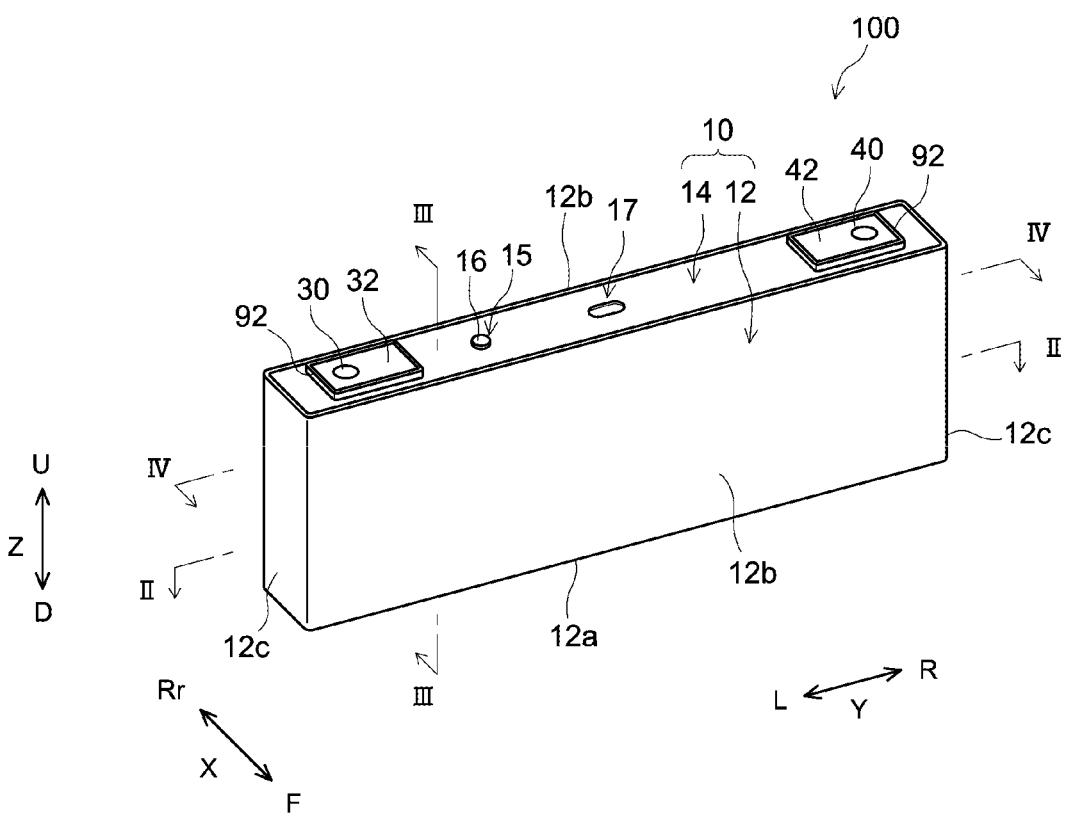
FIG. 1 is a perspective view schematically showing a battery according to an embodiment
Figure 2:
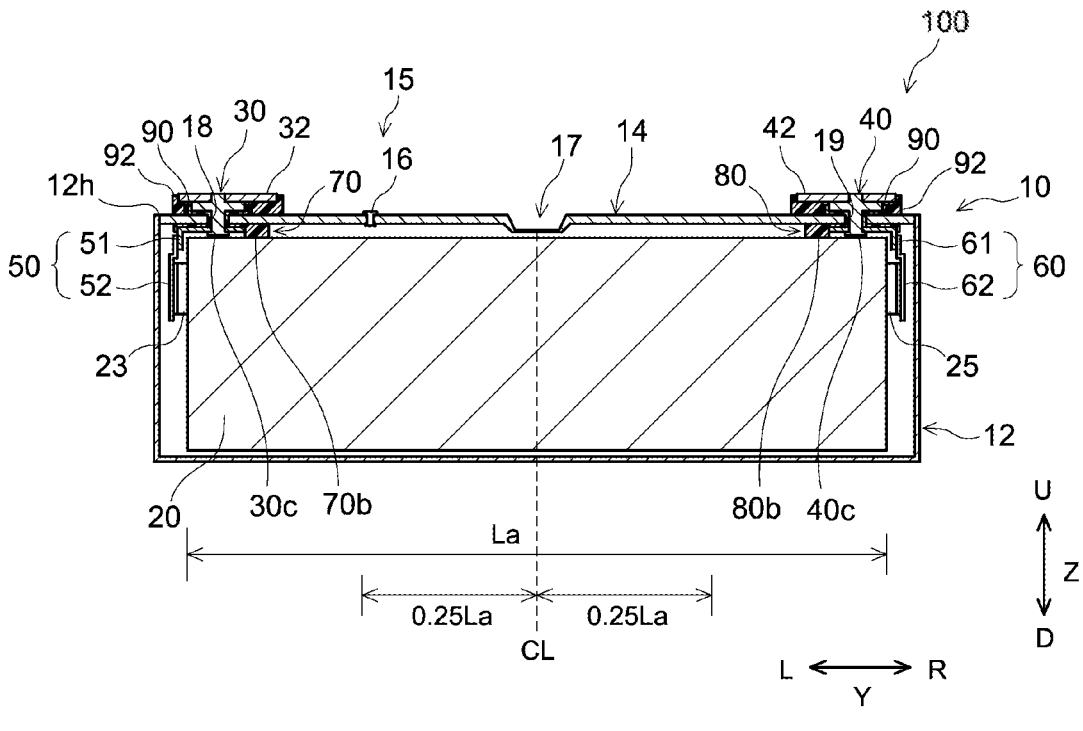
FIG. 2 is a schematic longitudinal section view along a line II-II in FIG. 1.
Figure 3:
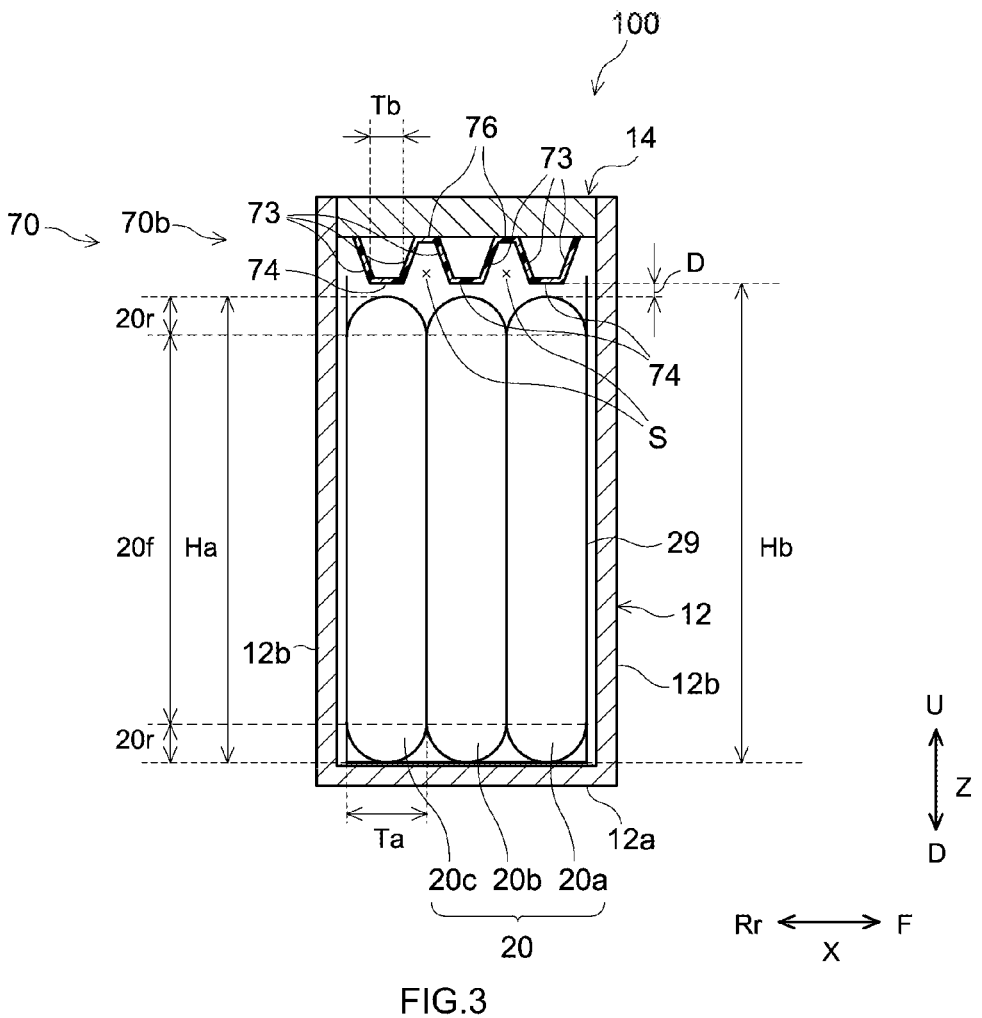
FIG. 3 is a schematic longitudinal section view along a line in III-III FIG. 1.
Figures 4, 5:
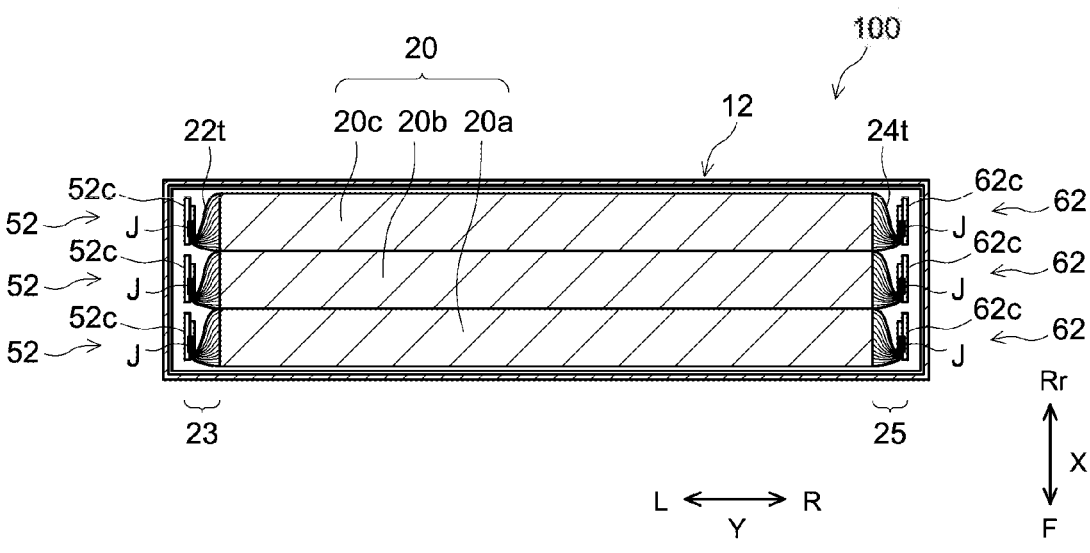
FIG. 4 is a schematic cross-sectional view along a line IV-IV in FIG. 1.
FIG. 5 is a perspective view schematically showing an electrode body group attached to a sealing plate.

FIG. 1 is a perspective view of a battery 100. FIG. 2 is a schematic longitudinal section view along a line II-II in FIG. 1. FIG. 3 is a schematic longitudinal section view along a line III-III in FIG. 1, FIG. 4 is a schematic cross-sectional view along a line IV-IV in FIG. 1. Meanwhile, in the following description, signs L, R, F, Rr, U, and D in the drawing represent left, right, front, back, up, and down, and signs Y, and Z in the drawing represent a short side direction of the battery 100, a long side direction perpendicular to the short side direction, and an up-down direction, respectively. The long side direction Y is an example of a first direction disclosed herein, and the short side direction is an example of a second direction disclosed herein. However, these are merely directions for convenience of description and do not limit the form of installation of the battery 100.

As shown in FIG. 2, the battery 100 includes a battery case 10, an electrode body group 20, a positive electrode terminal 30 a negative electrode terminal 40, a positive electrode collecting unit 50, a negative electrode collecting unit 60, a positive electrode insulating member 70, and a negative electrode insulating member 80. Although not shown in the drawing, the battery 100 further includes an electrolytic solution here. Here, the battery 100 is a lithium ion secondary battery. The battery 100 is characterized by including the positive electrode insulating member 70 and/or the negative electrode insulating member 80 disclosed herein, and other configurations may be the same as those in the related art. The positive electrode insulating member 70 and the negative electrode insulating member 80 are examples of insulating members disclosed herein.

The battery case 10 is a housing that accommodates the electrode body group 20. Here, the battery case 10 has an outward form having a flat and bottomed rectangular parallelepiped shape (square shape). The material of the battery case 10 may be the same as a material that has been used hitherto, and is not particularly limited. The battery case 10 is preferably formed of a metal and is more preferably formed of, for example, aluminum, an aluminum alloy, iron, an iron alloy, or the like. As shown in FIG. 2, the battery case 10 includes an exterior body 12 having an opening 12h, and a sealing plate (lid) 14 that covers the opening 12h.

As shown in FIG. 1, the exterior body 12 includes a bottom wall 12a, a pair of long side walls 12b that extend from the bottom wall 12a and face each other, and a pair of short side walls 12c that extend from the bottom wall 12a and face each other. The bottom wall 12a has substantially a rectangular shape. The bottom wall 12a faces the opening 12h. The area of the short side wall 12c is smaller than the area of the long side wall 12b. The long side wall 12b and the short side wall 12c are examples of a first side wall and a second side wall that are disclosed herein. The sealing plate 14 is attached to the exterior body 12 to block the opening 12h of the exterior body 12. The sealing plate 14 faces the bottom wall 12a of the exterior body 12. The sealing plate 14 has substantially a rectangular shape when seen in a plan view. The battery case 10 is integrated by the sealing plate 14 being bonded to a peripheral edge of the opening 12h of the exterior body 12 (for example, welding bonding). The battery ease 10 is airtightly sealed (closed).

As shown in FIG. 2 the sealing plate 14 is provided with a liquid injection hole 15, a gas exhaust valve 17, and two terminal draw-out holes 18 and 19. The liquid injection hole 15 is a hole for injecting an electrolytic solution after the sealing plate 14 is assembled into the exterior body 12. The liquid injection hole 15 is sealed by a sealing member 16. The gas exhaust valve 17 is configured to fracture when pressure inside the battery case 10 reaches a predetermined value or more and discharge a gas in the battery case 10 to the outside. The terminal draw-out holes 18 and 19 are formed in both ends of the sealing plate 14 in the long side direction Y. The terminal draw-out holes 18 and 19 penetrate the sealing plate 14 in the up-down direction Z. The terminal draw-out holes 18 and 19 respectively have such inner diameters as to penetrate the positive electrode terminal 31) and the negative electrode terminal 40 before the electrode terminals are attached to the sealing plate 14 (before caulking).

The positive electrode terminal 30 and the negative electrode terminal 40 are fixed to the sealing plate 14. The positive electrode terminal 30 is disposed on one side of the sealing plate 14 in the long side direction Y (the left side in FIGS. 1 and 2). The negative electrode terminal 40 is disposed on the other side of the sealing plate 14 in the long side direction Y (the right side in FIGS. 1 and 2). As shown in FIG. 1, the positive electrode terminal 30 and the negative electrode terminal 40 are exposed through the outer surface of the sealing plate 14. As shown in FIG. 2, the positive electrode terminal 30 and the negative electrode terminal 40 penetrate the terminal draw-out holes 18 and 19 and extend from the inside to the outside of the sealing plate 14. Here, the positive electrode terminal 30 and the negative electrode terminal 40 are caulked to a peripheral edge portion of the sealing plate 14 which surrounds the terminal draw-out holes 18 and 19 by caulking. Caulking portions 30c and 40c are formed at ends of the positive electrode terminal 30 and the negative electrode terminal 40 on the exterior body 12 side (a lower end portion in FIG. 2).

As shown in FIG. 2, the positive electrode terminal 30 is electrically connected to a positive electrode 22 of the electrode body group 20 through the positive electrode collecting unit 50 inside the exterior body 12. The negative electrode terminal 40 is electrically connected to a negative electrode 24 of the electrode body group 20 through the negative electrode collecting unit 60 inside the exterior body 12. The positive electrode terminal 30 is insulated from the sealing plate 14 by the positive electrode insulating member 70 and a gasket 90. The negative electrode terminal 40 is insulated from the scaling plate 14 by the negative electrode insulating member go and the gasket 90. The positive electrode terminal 30 and the negative electrode terminal 40 are examples of terminals disclosed herein.

The positive electrode terminal 30 is preferably formed of a metal arid is more preferably formed of, for example, aluminum or an aluminum alloy. The negative electrode terminal 40 is preferably formed of a metal and is more preferably formed of for example, copper or a copper alloy. The negative electrode terminal 40 may be configured of two conductive members bonded together and integrated. For example, a portion connected to the negative electrode collecting unit 60 may be formed of copper or a copper alloy, and a portion exposed through the outer surface of the sealing plate 14 may be formed of aluminum or an aluminum alloy.

As shown in FIG. 1, a plate-shaped positive electrode external conductive member 32 and negative electrode external conductive member 42 are attached to the outer surface of the sealing plate 14. The positive electrode external conductive member 32 is electrically connected to the positive electrode terminal 30. The negative electrode external conductive member 42 is electrically connected to the negative electrode terminal 40. The positive electrode external conductive member 32 and the negative electrode external conductive member 42 are members to which a bus bar is attached when a plurality of batteries 100 are electrically connected to each other. The positive electrode external conductive member 32 and the negative electrode external conductive member 42 are preferably formed of a metal and are more preferably formed of, for example, aluminum or an aluminum alloy. The positive electrode external conductive member 32 and the negative electrode external conductive member 42 are insulated from the sealing plate 14 by an external insulating member 92. However, the positive electrode external conductive member 32 and the negative electrode external conductive member 42 are not essential members, and can also be omitted in other embodiments.

FIG. 5 is a perspective view schematically showing the electrode body group 20 attached to the sealing plate 14. Here, the electrode body group 20 includes three electrode bodies 20a, 20b, and 20c. However, the number of electrode bodies disposed inside one exterior body 12 is not particularly limited, and may be two or more (plural) or may be one. The electrode body group 20 is covered with an electrode body holder 29 (see FIG. 3) constituted by a resin sheet and disposed inside the exterior body 12.

Figure 6:
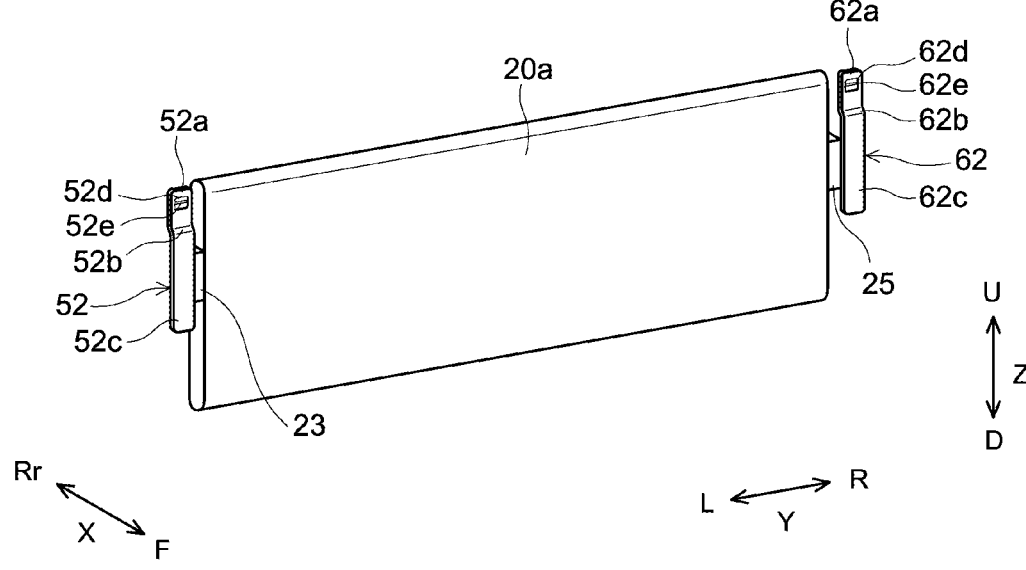
FIG. 6 is a perspective view schematically showing an electrode body to which a positive electrode second collecting unit and a negative electrode second collecting unit are attached.
Figure 7:
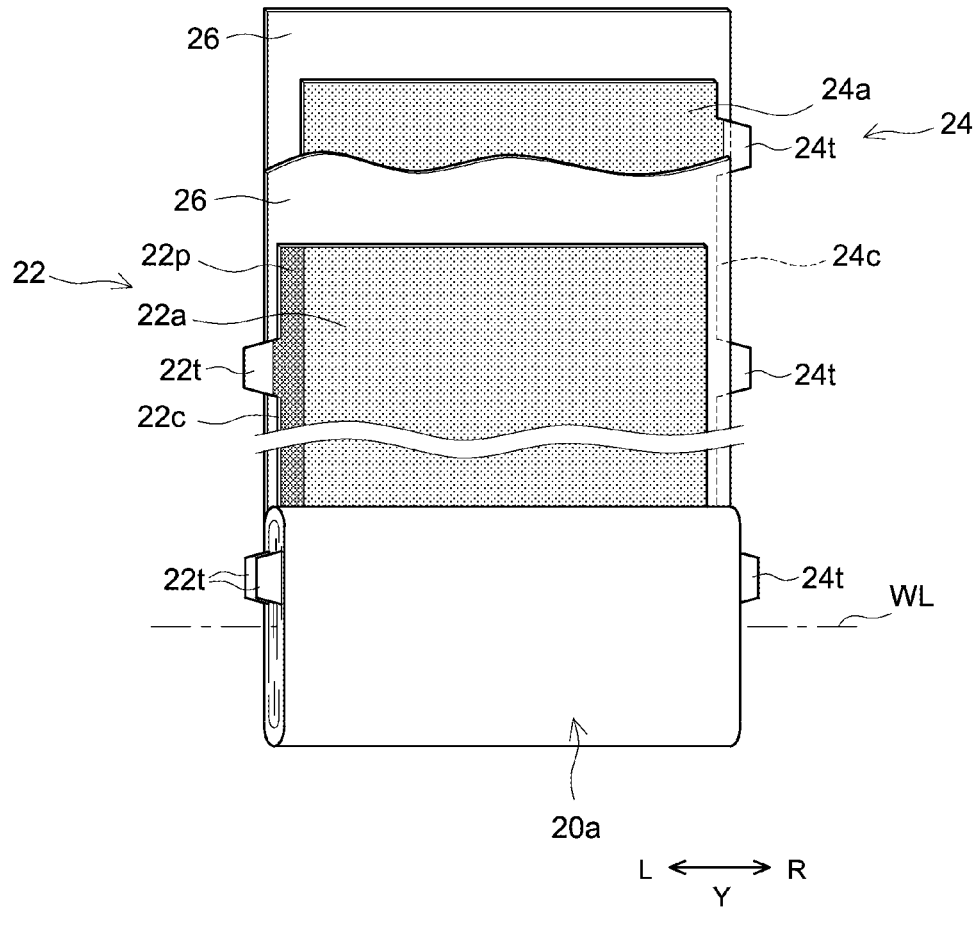
FIG. 7 is a schematic view showing a configuration of a winding electrode body.

FIG. 6 is a perspective view schematically showing the electrode body 20a. FIG. 7 is a schematic view showing a configuration of the electrode body 20a. Meanwhile, detailed description will be given below with the electrode body 20a as an example, but the electrode bodies 20b and 20c can also be configured in the same manner. As shown in FIG. 7, the electrode body 20a includes a positive electrode 22 and a negative electrode 24. Here, the electrode body 20a is a flat winding electrode body in which the band-like positive electrode 22 and the band-like negative electrode 24 are laminated through a band-like separator 26 and are wound centering on a winding axis WL. The positive electrode 22 and the negative electrode 24 are examples of a first electrode and a second electrode disclosed herein.

The electrode body 20a is disposed inside the exterior body 12 in a direction in which the winding axis WL is parallel to the long side direction Y. In other words, the electrode body 20a is disposed inside the exterior body 12 in a direction in which the winding axis WL is parallel to the bottom wall 12a and perpendicular to the short side wall 12c. An end face of the electrode body 20a (in other words, a lamination surface on Which the positive electrode 22 and the negative electrode 24 are laminated, an end face in the long side direction Y is FIG. 7) faces the short side wall 12c.

As shown in FIG. 3, the electrode body 20a includes a pair of curved portions 20r facing the bottom wall 12a of the exterior body 12 and the sealing plate 14, and a flat portion 20f connecting the pair of curved portions 20r and facing the long side wall 12b of the exterior body 12. However, the electrode body 20a may be a laminated electrode body in which a plurality of square (typically, rectangular) positive electrodes and a plurality of square (typically, rectangular) negative electrodes are laminated on each other in an insulated state.

As shown in FIG. 7, the positive electrode 22 includes a positive electrode collector 22c, and a positive electrode active material layer 22a and a positive electrode protection layer 22p which are firmly fixed onto at least one surface of the positive electrode collector 22c. However, the positive electrode protection layer 22p is not an essential component and can also be omitted in other embodiments. The positive electrode collector 22c has a band shape. The positive electrode collector 22c is formed of a conductive metal such as aluminum, an aluminum alloy, nickel, or stainless steel. Here, the positive electrode collector 22c is a metal foil, specifically an aluminum foil.

A plurality of positive electrode tabs 22t are provided at one end (the left end in FIG. 7) of the positive electrode collector 22c in the long side direction Y. Each of the plurality of positive electrode tabs 22t protrudes toward one side (the left side in FIG. 7) in the long side direction Y. The plurality of positive electrode tabs 22t protrude from the separator 26 in the long side direction Y. The plurality of positive electrode tabs 22t are provided at intervals (intermittently) in the longitudinal direction of the positive electrode 22. Each of the plurality of positive electrode tabs 22t has a trapezoidal shape. Here, the positive electrode tab 22t is a portion of the positive electrode collector 22c and is formed of a metal foil (aluminum foil). Here, the positive electrode tab 22t is a portion (collector exposing portion) of the positive electrode collector 22c in which the positive electrode active material layer 22a and the positive electrode protection layer 22p are not formed. However, the positive electrode tab 22t may be a member separate from the positive electrode collector 22c. In addition, the positive electrode tabs 22t may be provided at the other end (the right end in FIG. 7) in the long side direction Y or may be provided at both ends in the long side direction Y.

As shown in FIG. 4, the plurality of positive electrode tabs 22t are laminated at one end (the left end in FIG. 4) in the long, side direction Y and constitute a positive electrode tab group 23. The plurality of positive electrode tabs 22t are bent and cured such that outer ends thereof are aligned. The positive electrode tab group 23 is electrically connected to the positive electrode terminal 30 through the positive electrode collecting unit 50. It is preferable that the plurality of positive electrode tabs 22t be bent and electrically connected to the positive electrode terminal 30. A positive electrode second collecting unit 52 to be described later is attached to the positive electrode tab group 23. The size of each of the plurality of positive electrode tabs 22t the length in the long side direction Y and a width perpendicular to the long side direction Y, see FIG. 7) can be appropriately adjusted in accordance with, the example, its formation position or the like in consideration of a state where the positive electrode tabs 22t are connected to the positive electrode collecting unit 50. Here, the plurality of positive electrode tabs 22t have different sizes so that the outer ends thereof are aligned when they are curved. The positive electrode tab group 23 is an example of an electrode tab group disclosed herein.

As shown in FIG. 7, the positive electrode active material layer 22a is provided to have a band shape in the longitudinal direction of the band-like positive electrode collector 22c. The positive electrode active material layer 22a contains a positive electrode active material (for example, a lithium transition metal composite oxide such as a lithium nickel cobalt manganese comp site oxide) capable of reversibly occluding and releasing charge carriers. When a total solid content of the positive electrode active material layer 22a is defined as 100% by mass, a positive electrode active material layer occupy approximately 80% or more by mass, typically 90% or more by mass, for example, 95% or more by mass. The positive electrode active material layer 22a may contain any component other than the positive electrode active material, for example, a conductive material, a binder, various additive components, and the like. As the conductive material, a carbon material such as acetylene black (AB) can be used. As the binder, for example, polyvinylidene fluoride (PVdF) or the like can be used.

As shown in FIG. 7, the positive electrode protection layer 22p is provided at a. boundary portion between the positive electrode collector 22c and the positive electrode active material layer 22a in the long side direction Y. Here, the positive electrode protection layer 22p is provided at one end the left end in FIG. 7) of the positive electrode collector 22c in the long side direction Y. However, the positive electrode protection layer 22p may be provided at both ends in the long side direction Y. The positive electrode protection layer 22p is formed in a band shape along the positive electrode active material layer 22a. The positive electrode protection layer 22p contains an inorganic tiller (for example alumina), When a total solid content of the positive electrode protection layer 22p is defined as 100% by mass, an inorganic filler may occupy approximately 50% or more by mass and typically 70% or more by mass, for example, 80% or more by mass. The positive electrode protection layer 22p may contain any component other than the inorganic filler, example, a conductive material, a binder, various additive components, and the like. The conductive material and the binder may be the same as those exemplified as being able to be contained in the positive electrode active material layer 22a.

As shown in FIG. 7, the negative electrode 24 includes a negative electrode collector 24c and a negative electrode active material layer 24a which is firmly fixed onto at least one surface of the negative electrode collector 24c. The negative electrode collector 24c has a band shape. The negative electrode collector 24c is formed of a conductive metal such as copper, a copper alloy, nickel, or stainless steel. Here, the negative electrode collector 24c is a metal foil, specifically a copper foil.

A plurality of negative electrode tabs 24t are provided at one end (the right end in FIG. 7) of the negative electrode collector 24c in the long side direction Y. The plurality of negative electrode tabs 24t protrude toward one side the right side in FIG. 7) in the long side direction Y. The plurality of negative electrode tabs 24t protrude from the separator 26 in the long side direction Y. The plurality of negative electrode tabs 24t are provided at intervals (intermittently) in the longitudinal direction of the negative electrode 24. Each of the plurality of negative electrode tabs 24t has a trapezoidal shape. Here, the negative electrode tab 24t is a portion of the negative electrode collector 24c and is formed of a metal foil (copper foil). Here, the negative electrode tab 24t is a portion (collector exposing portion) of the negative electrode collector 24c in which the negative electrode active material layer 24a is not formed. However, the negative electrode tab 241 may be a member separate from the negative electrode collector 24c. In addition, the negative electrode tab 24t may be provided at the other end (the left end in FIG. 7) in the long side direction Y or may be provided at both ends in the long side direction Y.

As shown in FIG. 4 the plurality of negative electrode tabs 24t are laminated at one end (the left end in FIG. 6) in the long side direction Y and constitute the negative electrode tab group 25. The plurality of negative electrode tabs 24t are bent and cured such that outer ends thereof are aligned. The negative electrode tab group 25 is electrically connected to the negative electrode terminal 40 through the negative electrode collecting unit 60. It is preferable that the plurality of negative electrode tabs 24t be bent and electrically connected to the negative electrode terminal 40. A negative electrode second collecting unit 62 to be described later is attached to the negative electrode tab group 25. The site of each of the plurality of negative electrode tabs 24t (the length in the long side direct on Y and a width perpendicular to the long side direction Y, see FIG. 7) can be appropriately adjusted in accordance with, for example, its formation position or the like in consideration of a state where the negative electrode tabs 241 are connected to the negative electrode collecting unit 60. Here, the plurality of negative electrode tabs 24t have different sires so that the outer ends thereof are aligned when they are curved. The negative electrode tab group 25 is an example of an electrode tab group disclosed herein.

The negative electrode active material layer 24a is provided to have a band shape in the longitudinal direction of the band-like negative electrode collector 24c. The negative electrode active material layer 24a contains a negative electrode active material (for example, a carbon material such as graphite) capable of reversibly occluding and releasing charge carriers. When a total solid content of the negative electrode active material layer 24a is set to 100% by mass, a negative electrode active material may occupy approximately 80% or more by mass, typically 90% or more by mass, for example, 95% or more by mass. The negative electrode active material layer 24a may contain any component other than the negative electrode active material, for example, a binder, a dispersing agent, various additive components, and the like. As the binder, rubbers such as styrene-butadiene rubber (SBR) can be used. As the dispersing agent, cell rolls such as carboxymethyl cellulose (CMC) can be used.

The separator 26 is a member that insulates the positive electrode active material layer 22a of the positive electrode 22 and the negative electrode active material layer 24a of the negative electrode 24 from each other. As the separator 26, a porous resin sheet formed of a polyolefin resin such as polyethylene (PF) or polypropylene (PP) is suitable. Meanwhile, a heat resistance layer (HRL) containing an inorganic filler may be provided on the surface of the separator 26. As the inorganic filler, for example, alumina, boehmite, aluminum hydroxide, titania, and the like can be used.

An electrolytic solution may be the same as that in the related art and is not particularly limited. The electrolytic solution is, for example, a non-aqueous electrolytic solution containing a ton-aqueous solvent and a supporting salt. The non-aqueous solvent contains carbonates such as ethylene carbonate, dimethyl carbonate, and ethyl methyl carbonate. The supporting salt is a fluorine-containing lithium salt such as $LIPF_6$. However, the electrolytic solution is in a solid state (solid electrolyte) and may be integrated with the electrode body group 20.

The positive electrode collecting unit 50 constitutes a conductive path that electrically connects the positive electrode tab group 23 constituted by the plurality of positive electrode tabs 22t and the positive electrode terminal 30. As shown in FIG. 2, the positive electrode collecting unit 50 includes a positive electrode first collecting unit 51 and a positive electrode second collecting unit 52. The positive electrode first collecting unit 51 and the positive electrode second collecting unit 52 may be formed of the same metal type as the positive electrode collector 22c, for example, a conductive metal such as aluminum, an aluminum alloy, nickel, or stainless steel.

Figure 8:
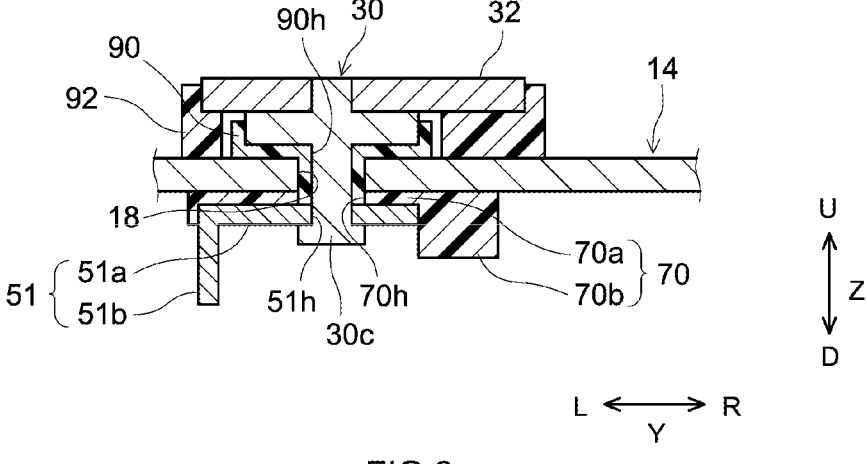
FIG. 8 is a partially enlarged cross-sectional view schematically showing the surroundings of a positive electrode terminal in FIG. 2.
Figure 9:
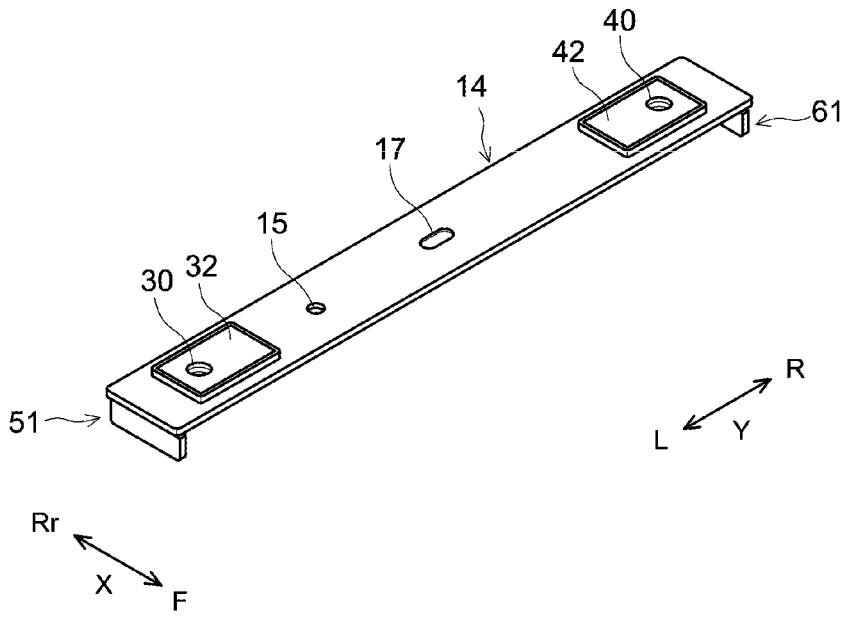
FIG. 9 is a perspective view schematically showing a sealing plate to which a positive electrode terminal, a negative electrode terminal, a positive electrode first collecting unit, a negative electrode first collecting unit, a positive electrode insulating member, and a negative electrode insulating member are attached.
Figure 10:
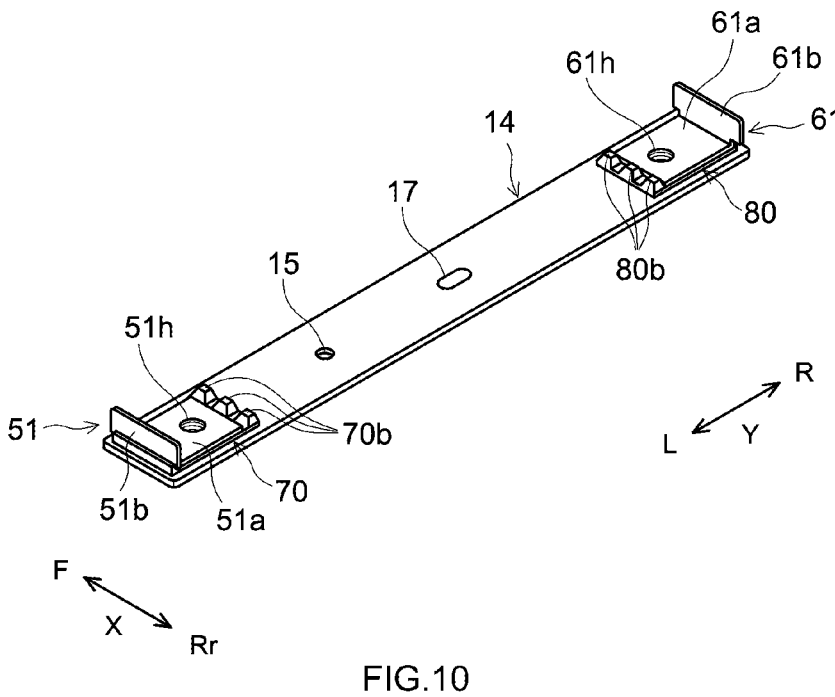
FIG. 10 is a perspective view of the sealing plate in FIG. 9 which is turned inside out.

FIG. 8 is a partially enlarged cross-sectional view schematically showing the surroundings of the positive electrode terminal 30 in FIG. 2. FIG. 9 is a perspective view schematically showing the sealing plate 14. FIG. 10 is a perspective view of the sealing plate in FIG. 9 which is turned inside out: FIG. 10 shows a surface of the sealing plate 14 on the side (the inner side) of exterior body 12. As shown in FIGS. 8 to 10, the positive electrode first collecting unit 51 is attached to the inner surface of the sealing plate 14. The positive electrode first collecting unit 51 is an example of a collecting unit disclosed herein. The positive electrode first collecting unit 51 includes a first region 51a and a second region 51b. The positive electrode first collecting unit 51 may be configured by bending one member by, for example, press working or the like, or may be configured by integrating a plurality of members by welding bonding or the like. Here, the positive electrode first collecting unit 51 is fixed to the sealing plate 14 by caulking.

The first region 51a is a part disposed between the sealing plate 14 and the electrode body group 20. The first region 51a extends in the long side direction Y. The first region 51a extends horizontally along the inner surface of the sealing plate 14. The positive electrode insulating member 70 is disposed between the sealing plate 14 and the first region 51a. The first region 51a is insulated from the sealing plate 14 by the positive electrode insulating member 70. Here, the first region 51a is electrically connected to the positive electrode terminal 30 by caulking. In the first region 51a, a through hole 51h formed in the up-down direction Z is formed at a position of the sealing plate 14 corresponding to the terminal draw-out hole 18. The second region 51b is a part disposed between the short side wall 12c of the exterior body 12 and the electrode body group 20. The second region 51b extends from one end of the first region 51a in the long side direction Y (the left end in FIG. 8) to the short side wall 12c of the exterior body 12. The second region 31b extends in the up-down direction Z.

The positive electrode second collecting unit 52 extends along the short side wall 12c of the exterior body 12. As shown in FIG. 6, the positive electrode second collecting unit 52 includes a current collector plate connection portion 52a, an inclined portion 52b, and a tab bonding portion 52c. The current collector plate connection portion 52a is a part which is electrically connected to the positive electrode first collecting unit 51. The current collector plate connection portion 52a extends in the up-down direction Z. The current collector plate connection portion 52a is disposed to be substantially perpendicular to the winding axis WL of the electrode bodies 20a, 20b, and 20c. The current collector plate connection portion 52a is provided with a concave portion 52d having a thickness smaller than the periphery thereof. The concave portion 52d is provided with a through hole 52e formed in the short side direction X. A bonding portion for the positive electrode first collecting unit 51 is formed in the through hole 52e. The bonding portion is a welding bonding portion formed by welding such as ultrasonic welding, resistance welding:, or laser welding. The positive electrode second collecting unit 52 is provided with a fuse.

The tab bonding portion 52c is apart which is attached to the positive electrode tab group 23 and electrically connected to the plurality of positive electrode tabs 22t. As shown in FIG. 5, the tab bonding portion 52c extends in the up-down dire ion Z. The tab bonding portion 52c is disposed to be substantially perpendicular to the winding axis WL of the electrode bodies 20a, 20b, and 20c. A surface of the tab bonding portion 52c which is connected to the plurality of positive electrode tabs 22t is disposed to be substantially parallel to the short side wall 12c of the exterior body 12. As shown an FIG. 4, a bonding portion J for the positive electrode tab group 23 is formed in the tab bonding portion 52c. The bonding portion J is a welding bonding portion which is formed by welding such as ultrasonic welding, resistance welding, or laser welding, for example, in a state where the plurality of positive electrode tabs 22t overlap each other. In the welding bonding portion, the plurality of positive electrode tabs 22t are disposed to be close to one sides of the electrode bodies 20a, 20b, and 20c in the short side direction X. Thereby, it is possible to stably form the curved positive electrode tab group 23 as shown in FIG. 4 by more suitably bending the plurality of positive electrode tabs 22t.

The inclined portion 52b is a part that connects a lower end of the current collector plate connection portion 52a and an upper end of the tab bonding portion 52e. The inclined portion 52b is inclined with respect to the current collector plate connection portion 52a and the tab bonding portion 52c. The inclined portion 52h connects the current collector plate connection portion 52a and the tab bonding portion 52c so that the current collector plate connection portion 52a is positioned on a side closer to the center than the tab bonding portion 52c in the long side direction Y. Thereby, it is possible to achieve high energy density of the battery 100 by enlarging an accommodation space for the electrode body group 20. It is preferable that a lower end of the inclined portion 52b (in other words, an end of the exterior body 12 on the bottom wall 12a side) be positioned below a lower end of the positive electrode tab group 23. Thereby, it is possible to stably form the curved positive electrode tab group 23 as shown in FIG. 4 by more suitably bending; the plurality of positive electrode tabs 221

The negative electrode collecting unit 60 constitutes a conductive path that electrically connects the negative electrode tab group 25 constituted by the plurality of negative electrode tabs 24t and the negative electrode terminal 40. As shown in FIG. 2, the negative electrode collecting unit 60 includes a negative electrode first collecting unit 61 and a negative electrode second collecting unit 62. The negative electrode first collecting unit 61 is an example of a collecting unit disclosed herein. The negative electrode first collecting unit 61 and the negative electrode second collecting unit 62 may be formed of the same metal type as the, negative electrode collector 24c for example, a conductive metal such as copper, a copper alloy, nickel, or stainless steel. Configurations of the negative electrode first collecting unit 61 and the negative electrode second collecting unit 62 may be the same as the configurations of the positive electrode first collecting unit 51 and the positive electrode second collecting unit 52 of the positive electrode collecting unit 50.

As shown in FIG. 10, the negative electrode first collecting unit 61 includes a first region 61a and a second region 61b. The negative electrode insulating member 80 is disposed between the sealing plate 14 and the first region 61a. The first region 61a is insulated from the sealing plate 14 by the negative electrode insulating member 80. In the first region 51a, a through hole 61h formed in the up-down direction Z is for ed at a position of the sealing plate 14 corresponding to the terminal draw-out hole 19. As shown in FIG. 6, the negative electrode second collecting unit 62 includes a current collector plate connection portion 62a which is electrically connected to the negative electrode first collecting unit 61, an inclined portion 62b, and a tab bonding portion 62c which is attached to the negative electrode tab group 25 and electrically connected to the plurality of negative electrode tabs 24t. The current collector plate connection portion 62a includes a concave portion 62d connected to the tab bonding portion 62c. The concave portion 62d is provided with a through hole 62e formed in the short side direction X.

Figure 11:
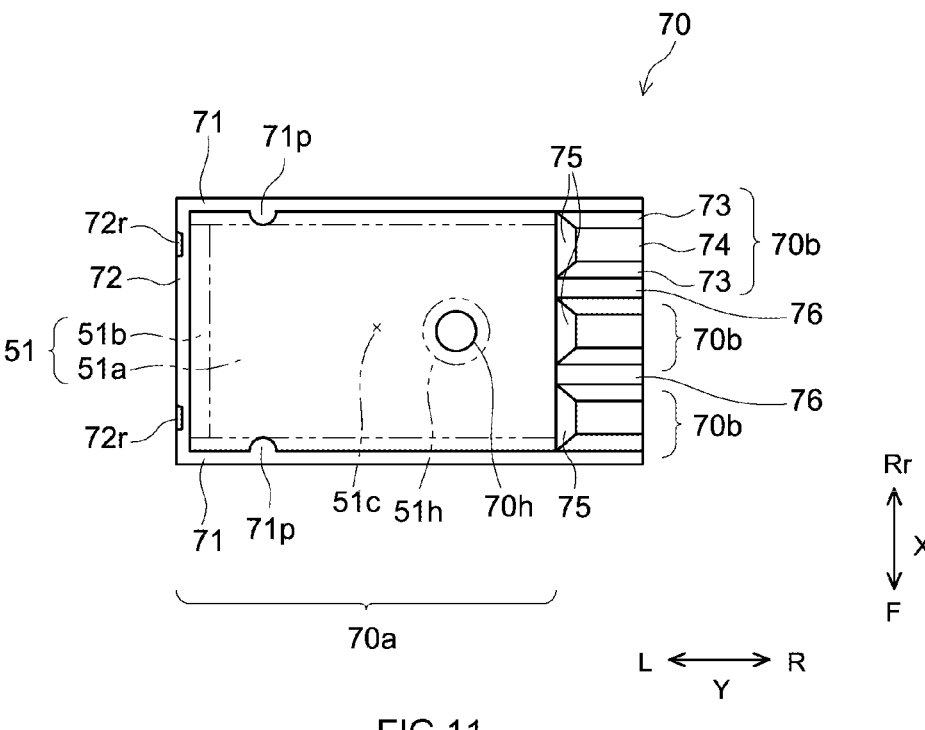
FIG. 11 is a plan view schematically showing the positive electrode insulating member.

FIG. 11 is a plan view schematically showing the positive electrode insulating member 70. Meanwhile, detailed description will be given below with the positive electrode insulating member 70 as an example, but the negative electrode insulating member 80 can also be configured in the saute manner. The positive electrode insulating member 70 is a member that insulates the sealing plate 14 and the positive electrode first collecting unit: 51 from each other. In FIG. 11, the positive electrode first collecting writ 51 is indicated by a virtual line to overlap the positive electrode insulating member 70. The positive electrode insulating member 70 is formed of a resin material having resistance to an electrolytic solution to be used and an electrical insulating property and being elastically deformable, and is preferably formed of a polyolefin resin such as polypropylene (PP), a fluorinated resin such as ethylene tetralluoride-pertluoroalkoxy ethylene copolymer (PFA), polyphenylene sulfide (PPS), or the like.

As shown in FIG. 11, the positive electrode insulating member 70 includes a base portion 70a and a plurality of protrusion portions 70h. As shown in FIG. 10, the plurality of protrusion portions 70b are provided to be closer to the center side of the sealing plate 14 (the right side in FIG. 10) than the base portion 70a in the long side direction Y. The base portion 70a and the protrusion portion 70b are integrated with each other here. The positive electrode insulating member 70 is an integrally molded product obtained by integrally molding, the above-mentioned resin material. Thereby, it is possible to reduce the number of members to be used as compared to a case where the base portion 70a and the protrusion portion 70b are configured as separate members, and to realize a reduction in cost. In addition, the positive electrode .insulating, member 70 can be prepared more easily.

Here, the number of protrusion portions 70b the same as the number of electrode bodies 20a, 20b, and 20c constituting the electrode body group 20. That is, the number is three. Thereby, the electrode bodies 20a, 20b and 20c and the protrusion portions 70b can be more reliably made to face each other, and effects of the technology disclosed herein can be farther improved. Further, in a push-into step'to be described later, the electrode bodies 20a, 20b, and 20c and the protrusion portions 70b can be brought into contact with each other in a well-balanced manner. However, the number of protrusion portions 70b may be different from the number of electrode bodies constituting the electrode body group 20, and may be, for example, one.

As shown in FIG. 3, here, the protrusion portions 70b face the curved portions 20r of the electrode bodies 20a, 20b, and 20c constituting the electrode body group 20. Thereby, it is possible to prevent end .faces of the electrode bodies 20a, 20b, and 20c from being pressed by the protrusion portions 70b even when the electrode bodies 20a, 20b, and 20c are moved to the side of the sealing plate 14 due to vibration, an impact, or the like applied during the use of the battery 100. Further in the push-into step to be described later, it is possible to prevent the end faces of the electrode bodies 20a, 20b, and 20c from being pressed by the protrusion portions 70b and damaged.

The base portion 70a is a part disposed between the sealing plate 14 and the first region 51a of the positive electrode first collecting unit 51 in the up-down direction Z. The base portion 70a extends horizontally along the first region 51a of the positive electrode first collecting unit 51. As shown in FIG. 11, here, the base portion 70a includes a through hole 70h formed in the up-down direction a pair of long side walls 71 provided at both ends in the short side direction X, a short side wall 72 provided at one end (the left end in FIG. 11) in the long side direction Y, a pair of convex portions 71p, and a pair of concave portions 72t. The through hole 70h is formed at a position corresponding to the terminal draw-out hole 18 of the sealing, plate 14. The through hole 70h is disposed to be closer to the side of the protrusion portion 70b (the right side in FIG. 11) than the center position 51c of the first region 51a of the positive electrode first collecting unit 51 in the long side direction Y, that is, disposed on the center side in the long side direction Y.

The pair of long side walls 71 extend in a band shape in the long side direction Y. The pair of long side walls 71 are disposed along the long side wall 12b of the exterior body 12. Although not particularly limited, an interval between the long side wall 71 and the first region 51a of the positive electrode first collecting unit 51 in the short side direction X is preferably set to approximately 1 mm or less, for example, 0.5 mm or less. Thereby, is possible to more effectively prevent the positive electrode insulating member 70 from moving (deviating) from a predetermined arrangement position. The short side wall 72 extends in a band shape in the short side direction X. The short side wall 72 connects one-side ends of of the pair of long side walls 71 (the left end in FIG. 11), The pair of convex portions 71p are parts the holding the positive electrode insulating member 70 at a stable position with respect to the sealing plate 14 and positive electrode first collecting unit 51. Here, the pair of convex portions 71p are parts for preventing the positive electrode insulating member 70 from moving (deviating) from a predetermined arrangement position. Specifically, the convex portions 71p are parts for preventing the positive electrode insulating member 70 from being rotated in a plane parallel to the sealing plate 14 centering on a caulk portion. The convex portions 71p protrude from the sealing plate 14 side to the electrode body group 20. The convex portions 71p protrude perpendicularly to the first region 51a of the positive electrode first collecting unit 51, it is preferable that the convex portions 71p protrude further toward the electrode body group 20 side than the surface of the first region 51a on the electrode body group 20 side in the up-down direction Z.

The pair of convex portions 71p are provided to hold the positive electrode first collecting unit 51 therebetween in the short side direction X. The pair of convex portions 71p are provided line-symmemically with respect to a symmetric axis that passes through the through hole 70h and extends in the long side direction Y. It is preferable that the convex portions 71p be disposed at positions distant from the through hole 70h, for example, positions distant by 5 mm or more in the long side direction Y. It is preferable that the convex portions 71p be disposed at positions distant from an outer edge of the positive electrode insulating member 70, for example, positions distant from the outer edge of the positive electrode insulating member 70 by 5 mm or more.

Here, the convex portions $71p$ are disposed at an inner peripheral edge of the long side wall $71$.

The convex portions $71p$ are disposed on a side opposite to the protrusion portions $70b$ with respect to the center position $51c$ of the positive electrode first collecting unit $51$ in the long side direction Y, in other words, on the outer side (the left side in FIG. 11). Regarding the convex portions $71p$, a distance from the center position $51c$ of the positive electrode first collecting unit $51$ is different from a distance from the center of the through hole $70h$. Specifically, the center of the through hole oh is disposed relatively near the center position $51c$ of the positive electrode first collecting unit $51$, and the convex portions $71p$ are disposed at positions relatively far from the center position $51c$. Although not particularly limited, an interval between the convex portion $71p$ and the first region $51a$ of the positive electrode first collecting unit $51$ in the short side direction X is preferably set to approximately 1 mm or less, and more preferably set to 0.5 mm or less. The convex portion $71p$ may abut on the first region $51a$ of the positive electrode first collecting unit $51$. Thereby, it is possible to more effectively suppress a positional deviation of the positive electrode first collecting unit $51$.

The pair of concave portions $72r$ are parts for performing positioning in the long side direction Y at the time of assembling the positive electrode first collecting unit $51$ and the positive electrode insulating member $70$ into the sealing plate $14$. The pair of concave portions $72r$ are provided line-symmetrically with respect to a symmetric axis that passes through the through hole $70h$ and extends in the long side direction Y. Here, the concave portion $72r$ is disposed at the short side wall $72$.

Each of the plurality of protrusion portions $70b$ protrudes closer to the side of the electrode body group $20$ than the base portion $70a$. When such protrusion portions $70h$ are provided, the electrode body group $20$ (specifically, the electrode bodies $20a$, $20b$, and $20c$) is not likely to move greatly toward the sealing plate $14$ inside the battery case $10$. For this reason, at least one of the positive electrode tab group $23$, the negative electrode tab group $25$, the tab bonding portion $52c$, and the tab bonding portion $62c$ is less likely to be damaged than in a case where such protrusion portions $70b$ are not provided. Thus, it is possible to stably maintain electrical connection between the positive electrode $22$ and the positive electrode terminal $30$, and/or between the negative electrode $24$ and the negative electrode terminal $40$, and improve conduction reliability of the battery $100$. In addition, it is possible to prevent the electrode body group $20$ from being damaged due to coming into contact with metal parts attached to the sealing plate $14$, for example, the positive electrode terminal $30$, the negative electrode terminal $40$, the positive electrode first collecting unit $51$, the negative electrode first collecting unit $61$, and the like. The protrusion portions $70h$ may constitute a spacer disposed between the sealing plate $14$ and the electrode bodies $20a$, $20b$, and $20c$.

As shown in FIG. 2 the protrusion portions $70b$ may be disposed on a side closer to the positive electrode tab group $23$ than a center CL of the electrode body group $20$ in the. long side direction Y. In other words, it is preferable that the protrusion portions $70b$ be disposed at positions (outer side) distant from the center CL of the electrode body group $20$ in the long side direction Y by 0.25 La or more when the length of the electrode body group $20$ in the long side direction Y is set to be La. Thereby, it is possible to effectively reduce a load applied to the positive electrode tab group $23$, particularly a load applied to the vicinity of an end (root) on a side close to the positive electrode protection layer $22p$ of the positive electrode tab $22t$. Further, it become easy to maintain the electrode body group $20$ and the sealing plate $14$ in parallel even when vibration, an impact, or the like is applied during the use of the battery $100$. In addition, the electrode body group $20$ can be stably pressed by the protrusion portions $70b$ and inserted into the exterior body $12$ in a push-into step to be described later.

As shown in FIG. 3, the plurality of protrusion portions $70b$ do not abut on the electrode bodies $20a$, $20b$, and $20c$ constituting the electrode body group $20$ in the state of the battery $100$, in other words, a state where the sealing plate $14$ is disposed above the exterior body $12$. The plurality of protrusion portions $70b$ are disposed at positions apart from the electrode bodies $20a$, $20b$, and $20c$. A length Ha of the electrode body $20a$ is smaller than a distance Hb from a lower end of the protrusion portion $70b$ to the bottom wall $12a$ of the exterior body $12$ in the up-down direction Z (that is, $Ha < Hb$). Thereby, even when vibration, an impact, or the like is applied during the use of ale battery $100$, it is possible to prevent the electrode bodies $20a$, $20b$, and $20c$ from being damaged due to rubbing between the protrusion portions $70b$ and the electrode bodies $20a$, $20b$, and $20c$. A shortest distance D between the protrusion portion $70b$ and the electrode bodies $20a$, $20b$, and $20c$ may be approximately 0.1 mm or more.

The shortest distance D between the protrusion portion $70b$ and the electrode bodies $20a$, $20b$, and $20c$ is preferably less than 5 nmm, more preferably less than 3 mm, and further preferably less than 2 mm. Thereby, it is possible to more effectively prevent the electrode bodies $20a$, $20b$, and $20c$ from being moved greatly to the side of the sealing plate $14$. Thus, the technology disclosed herein exerts higher effects. However, in other embodiments, the protrusion portion $70b$ and the electrode bodies $20a$, $20b$, and $20c$ may come into contact with each other in a state where the sealing plate $14$ is disposed above the exterior body $12$.

The plurality of protrusion portions $70b$ are disposed side by side in the short side direction X. The plurality of protrusion portions $70b$ face the electrode bodies $20a$, $20b$, and $20c$. It is preferable that the protrusion portions $70b$ protrude to be closer to the electrode body $20a$ than the surface of the first region $51a$ on the side of the electrode body group $20$ in the up-down direction Z. Thereby, it is possible to more effectively prevent the electrode bodies $20a$, $20b$, and $20c$ from being moved to the side of the sealing plate $14$. The protrusion portion $70b$ is formed in substantially a U shape in a cross-sectional view. As shown in FIG. 11, each of the plurality of protrusion portions $70b$ includes a pair of first vertical walls $73$, a lower horizontal wall $74$, and a second vertical wall $75$. When the protrusion portion $70b$ formed to have such a shape, a load applied to the positive electrode tab group $23$ can be effectively reduced by avoiding the concentration of stress even when the electrode bodies $20a$, $20b$, and $20c$ are moved to the side of the sealing plate $14$ due to vibration, an impact, or the like being applied during the use of the battery $100$.

The pair of first vertical walls $73$ extend in parallel in the long side direction Y. As shown in FIG. 3, the first vertical wall $73$ protrudes from the side of the sealing plate $14$ to the sides of the electrode bodies $20a$, $20b$, and $20c$ in a cross-sectional view. The pair of first vertical walls $73$ extend obliquely downward toward the electrode bodies $20a$, $20b$ and $20c$ (in other words, toward the bottom wall $12a$ of the exterior body $12$). The pair of first vertical walls $73$ are formed in a tapered shape in which the diameters thereof become smaller toward the electrode bodies $20a$, $20b$, and 20c. Although not particularly limited, a gradient angle of the first vertical wall 73 with respect to the lower horizontal wall 74 is preferably approximately 30 to 90 degrees, and more preferably 45 to 60 degrees. Thereby, a load applied to the electrode bodies 20a, 20b, and 20c can be reduced by avoiding the concentration of stress even when the protrusion portions 70b come into contact with the electrode bodies 20a, 20b, and 20c due to the electrode bodies 20a, 20b and 20c moving to the side of the sealing plate 14. In addition, the protrusion portions 70b can be molded into a stable shape.

As shown in FIG. 3, a region surrounded by the first vertical wall 73 of the protrusion portion 70b and the electrode bodies 20a, 20b, and 20c, specifically a region surrounded by the first vertical wall 73 of the adjacent protrusion portions 70b and the curved portions 20r of the electrode bodies 20a, 20b, and 20c communicates with the gas exhaust valve 17. Such a region is a gas flow path space S in which a gas generated inside the battery case 10, for example, a gas generated from end faces (end faces in the long side direction Y in FIG. 7) of the electrode bodies 20a, 20b, and 20c flows toward the gas exhaust valve 17. A gas generated inside the exterior body 12 (for example, inside the electrode body group 20) easily moves to the gas exhaust valve 17 side by the gas flow path space S being secured, and thus it is possible to smoothly operate the gas exhaust valve 17. In addition, the generated gas can be efficiently discharged from the gas exhaust valve 17.

The lower horizontal wall 74 extends in the long side direction Y. The lower horizontal wall 74 connects lower ends of the pair of first vertical walls 73, in other words, ends on the sides of the electrode bodies 20a, 20b, and 20c. The lower horizontal wall 74 is a part closest to the electrode body group 20 in the protrusion portion 70b. Although not particularly limited, the thickness of the lower horizontal wall 74 (the length in the up-down direction Z) is preferably approximately 0.5 to 2 mm. Thereby, the protrusion portion 70b can be molded into a stable shape. A width Tb of the lower horizontal wall 74 in the short side direction X is preferably 0.4 times or more a width Ta of each of the electrode bodies 20a, 20b, and 20c, and is more preferably 0.55 times or more. When the area of one of the electrode bodies 20a, 20b, and 20c is set to be 100%, the area of the lower horizontal wall 74 in a top view is preferably approximately 1% or more, and more preferably approximately 20% or less, for example, 10% or less, and further preferably 5% or less. Thereby, even when the protrusion portions 70b come into contact with the electrode bodies 20a, 20b, and 20c due to the electrode bodies 20a, 20b, and 20c moving to the side of the sealing plate 14, a load applied to the electrode bodies 20a, 20b, and 20c can be reduced by avoiding the concentration of stress. In addition, it is possible to secure a wide gas flow path space S and improve a gas release property. Here, the surface of the lower horizontal wall 74 on the sides of the electrode bodies 20a, 20b, and 20c is flat. However, the lower horizontal wall may be formed in a shape along the outer surfaces (upper surfaces) of the electrode bodies 20a, 20b, and 20c, for example, a curved shape along the curved portions 20r.

The second vertical wall 75 extends in the short side direction X. The second vertical wall 75 is connected to the base portion 70a, ends of the pair of first vertical walls 73 on the base portion 70a side (the left end in FIG. 11), and an end of the lower horizontal wall 74 on the base portion 70a side (the left end n FIG. 11). The second vertical wall 75 connects the pair of first vertical walls 73 and the lower horizontal wall 74 to the base portion 70a. The second vertical wall 75 extends obliquely downward toward the lower horizontal wall 74. Although not a particularly limited, a gradient angle of the second vertical wall 75 with respect to the lower horizontal wall 74 is preferably approximately 30 to 90 degrees, and more preferably 60 degrees or more. Thereby, a load applied to the electrode bodies 20a, 20b, and 20c can be reduced by avoiding the concentration of stress even when the protrusion portions 70b come into contact with the electrode bodies 20a, 20b, and 20c due to the electrode bodies 20a, 20b, and 20c moving to the side of the sealing plate 14. In addition, the protrusion portions 70b can be molded into a stable shape.

The adjacent protrusion portions 70b are connected to each other by an upper horizontal wall 76 in the short side direction X. The upper horizontal wall 76 extends in the long side direction Y. The tapper horizontal wall 76 extends in parallel with the pair of first vertical walls 73. The upper horizontal wall 76 connects ends of the first vertical walls 73 of the adjacent protrusion portions 70b on the side of the sealing plate 14 (front and back ends in FIG. 11). The upper horizontal wall 76 is connected to the base portion 70a. Thereby, a load applied to the positive electrode tab group 23 can be effectively reduced by avoiding the concentration of stress even when the protrusion portions 70b come into contact with the electrode bodies 20a, 20b, and 20c due to the electrode bodies 20a, 20b, and 20c moving to the side of the sealing plate 14.

As shown in FIG. 2, the negative electrode insulating member 80 is disposed to be symmetrical to the positive electrode insulating member 70 with respect to the center CL of the electrode body group 20 in the long side direction Y. A configuration of the negative electrode insulating member 80 may be the same as that of the positive electrode insulating member 70. Here, similarly to the positive electrode insulating member 70, the negative electrode insulating member 80 includes a base portion (not shown) disposed between the sealing plate 14 and the negative electrode first collecting unit 61, and a plurality of protrusion portions 60b (see FIG. 10).

It is preferable that the battery 100 include both the positive electrode insulating member 70 and the negative electrode insulating member 80. Thereby, even when vibration, an impact, or the like is applied during the use of the battery 100, it become easy to maintain the electrode body group 20 and the sealing plate 14 in parallel (the state in FIG. 2). In addition, the electrode body group 20 and the protrusion portions 70b can be made to more effectively abut on each other (for example, in a balanced manner in the long side direction Y) in a push-into step to be described later, and the electrode body group 20 can be stably pressed by the protrusion portions 70b and inserted into the exterior body 12.

Method of Manufacturing Battery 100

A method of manufacturing the battery 100 is characterized by using the above-described positive electrode insulating member 70 and/or negative electrode insulating. member 80. The other manufacturing processes may be the same as those in the related art. The battery 100 cart be manufactured by a manufacturing method including preparing the battery case 10 (the exterior body 12 and the sealing plate 14), the electrode body group 20 (the electrode bodies 20a, 20b, and 20c, an electrolytic solution, the positive electrode terminal 30, the negative electrode terminal 40, the positive electrode collecting unit 50 (the positive electrode first collecting unit 51 and the positive electrode second collecting unit 52), and the negative electrode collecting unit 60 (the negative electrode first collecting unit 61 and the negative electrode second collecting unit 62) in addition to the positive electrode insulating member 70 and the negative electrode insulating member 80 and including, for example, a first attachment step, a second attachment step, a push-into step, and a sealing step. In addition, the manufacturing method disclosed herein may further include another step at any stage, In the first attachment step, a first united object as shown in FIGS. 9 and 10 is manufactured. Specifically, first, the positive electrode terminal 30, the positive electrode first collecting unit 51, the positive electrode insulating member 70, the negative electrode terminal 40, the negative electrode first collecting unit 61 and the negative electrode insulating member 80 are attached to the sealing plate 14.

The positive electrode terminal 30, the positive electrode first collecting unit 51, and the positive electrode insulating member 70 are fixed to the sealing plate 14 by, for example, caulking (riveting). As shown in FIG. 8, caulking is performed by interposing the gasket 90 between the outer surface oldie sealing plate 14 and the positive electrode terminal 30 and interposing the positive electrode insulating member 70 between the inner surface of the sealing plate 14 and the positive electrode first collecting unit 51. Meanwhile, a material of the gasket 90 may be the same as that of the positive electrode insulating member 70. In detail, the positive electrode terminal 30 before the caulking is inserted into the through hole 90h of the gasket 90 the terminal draw-out hole 18 of the sealing plate 14, the through hole 70h of the positive electrode insulating member 70, and the through hole 51h of the positive electrode first collecting unit 51 in this order from above the sealing plate 14 sous to protrude below the sealing plate 14. Then, a portion of the positive electrode terminal 30 which protrudes downward from the sealing plate 14 is caulked so that a compressive force is applied in the up-down direction Z. Thereby, a caulking portion 30c is conned at a tip end of the positive electrode terminal 30 (a lower end in FIG. 2).

By such caulking, the gasket 90, the sealing plate 14, the positive electrode insulating member 70 and the positive electrode first collecting unit 51 are integrally fixed to the sealing plate 14, and the terminal draw-out hole 18 is sealed. Meanwhile, the caulking portion 30c may be welding-bonded to the positive electrode first collecting unit 51, Thereby, it is possible to further improve conduction reliability.

The fixing of the negative electrode terminal 40, the negative electrode first collecting unit 61, and the negative electrode insulating member 80 can be performed in the same manner as on the above-described positive electrode side. That is, the negative electrode terminal 40 before the caulking is inserted into the through, hole of the gasket, the terminal draw-out hole 19 of the sealing plate 14, the through hole of the negative electrode insulating member 80, and the through hole of the negative electrode first collecting unit 61 in this order from above the sealing plate 14 so as to protrude below the sealing plate 14. Then, a portion of the negative electrode terminal 40 which protrudes downward from the sealing plate 14 is caulked so that a compressive force is applied in the up-down direction Z. Thereby, a caulking portion 40c is formed at a tip end of the negative electrode terminal 40 (a lower end in FIG. 2).

Next, the positive electrode external conductive member 32 and the negative electrode external conductive member 42 are attached to the outer surface of the sealing plate 14 through the external insulating member 92. Meanwhile, a material of the external insulating member 92 may be the same as that of the positive electrode insulating member 70.

In addition, a timing at which the positive electrode external conductive member 32 and the negative electrode external conductive member 42 are attached may be after the push-into step (for example, after the liquid injection hole 15 is sealed).

In the second attachment step, a second united object shown in FIG. 5 is manufactured using the first united object .manufactured in the first attachment step. That is, the electrode body group 20 integrated with the sealing plate 14 is manufactured. Specifically, first, as shown in FIG. 6, three electrode bodies 20a to which the positive electrode second collecting unit 52 and the negative electrode second collecting unit 62 are attached are prepared and are disposed side by side in the short side direction X as the electrode bodies 20a, 20b, and 20c. In this case, all of the electrode bodies 20a, 20b, and 20c may be arranged in a row so that the positive electrode second collecting unit 52 is disposed on one side (the left side in FIG. 5) in the long side direction Y, and the negative electrode second collecting unit 62 is disposed on the other side (the right side in. FIG. 5) in the long side direction Y.

Next, in a state where the plurality of positive electrode tabs 22t are curved as shown in FIG. 4, the positive electrode first collecting unit 51 (in detail, the second region 51b fixed to the sealing plate 14 and the positive electrode second collecting units 52 (in detail, the current collector plate connection portions 52a) of the electrode bodies 20a, 20b, and 20c are bonded to each other. Further, in a state where the plurality of negative electrode tabs 24t are curved, the negative electrode first collecting unit 61 fixed to the sealing plate 14 and the negative electrode second collecting units 62 of the electrode bodies 20a, 20b, and 20c are bonded to each other. As a bonding method, welding such as ultrasonic welding, resistance welding, or laser welding can be used. In particular, it is preferable to use welding based on irradiation with high energy rays such as a laser. By such welding processing, a bonding portion is thrilled in each of the concave portion 52d of the positive electrode second collecting unit 52 and the concave portion 62d of the negative electrode second collecting unit 62.

Figure 12:
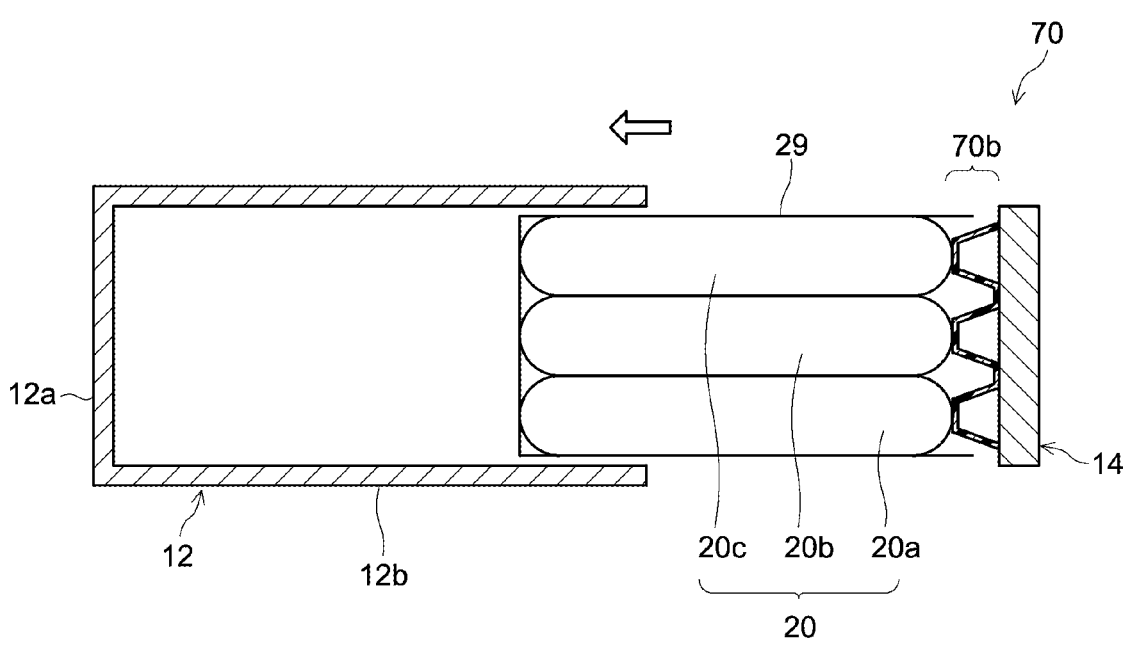
FIG. 12 is a schematic cross-sectional view showing a push-in step for the battery according to the embodiment.

In the push-into step, the second united object manufactured in the second attachment step is accommodated in an internal space of the exterior body 12. FIG. 12 is a schematic cross-sectional view showing the push-into step. Specifically, first, the electrode body holder 29 is prepared by bending an insulating resin sheet formed of a resin material such as polyethylene (PE) into a bag shape or a box shape. Next, the electrode body group 20 is accommodated in the electrode body holder 29. Then, the electrode body group 20 covered with the electrode body holder 29 is inserted into the exterior body 12. In a case where the weight of the electrode body group 20 is high and is approximately 1 kg or more, for example, 1.5 kg or more, and further 2 to 3 kg, the electrode body group 20 may be inserted into the exterior body 12 by disposing the long side wall 12b of the exterior body 12 so as to intersect the direction of gravity (disposing the exterior body 12 sideways) as shown in FIG. 12.

In this case, the curved portions 20r of the electrode bodies 20a, 20b, and 20c constituting the electrode body group 20 are pressed by the protrusion portions 70b of die positive electrode insulating member 70 and/or the protrusion portions 80b of the negative electrode insulating member 80 and pushed into the exterior body 12. The electrode body group 20 is pushed into by the protrusion portions 70b and or the protrusion portions 80b, and thus a load applied to the positive electrode tab group 23 and/or the negative electrode tab group 25 can be reduced. In this manner, the protrusion portions 70b of the positive electrode insulating member 70 and/or the protrusion portions 80b of the negative electrode insulating member 80 may function as cushioning materials for reducing a load, applied to the positive electrode tab group 23 and/or the negative electrode tab group 25 at the time of assembling the electrode body group 20 into the exterior body 12.

The positive electrode tab group 23 and/or the negative electrode tab group 25 has play to be movable in a direction intersecting a protrusion direction. Far this reason, when the exterior body 12 is raised so that the sealing plate 14 is positioned on the upper side thereof after inserting the electrode body group 20 into the exterior body 12, the electrode body group 20 moves slightly downward due to the gravity. Thereby as shown in FIG. 3, the protrusion portions 70b of the positive electrode insulating member 70 and the electrode bodies 20a, 20b, and 20c are disposed at positions separated from each other. In addition, the protrusion portions 80b at the negative electrode insulating member 80 and the electrode bodies 20a, 20b, and 20c are disposed at positions separated from each other.

In the sealing step, the sealing plate 14 is bonded to the edge portion of the opening 12h of the exterior body 12 to seal the opening 12h. The sealing step can be performed at the same time as the push-into step or after the push-into step. In the sealing step, it is preferable that the exterior body 12 and the sealing plate 14 be welding-bonded to each other. The welding bonding between the exterior body 12 and the sealing plate 14 can be performed for example, laser welding or the like. Thereafter, the battery 100 is sealed by injecting an electrolytic solution from the liquid injection hole 15 and blocking the liquid injection hole 15 with the sealing member 16. As described above, the battery 100 can be manufactured.

The battery 100 can be used for various purposes, but can be suitably used in an application in which are external three such as vibration of an impact may be applied during the use thereof, for example, as a power source (driving power source) for a motor mounted on a moving body (typically, a vehicle such as a passenger car or a truck). Although the type of vehicle is not particularly limited, examples thereof may include a plug-in hybrid vehicle (PHY), a hybrid vehicle (HV), an electric vehicle (EV), and the like. The battery 100 can also be suitably used as an assembled battery in which a plurality of batteries IOU are arranged in a predetermined arrangement direction and a load is applied from the arrangement direction by a restraint mechanism. Even in a state where a load is applied by the restraint mechanism, it is preferable that the protrusion portions 70b of the positive electrode insulating member 70 and/or the protrusion portions 80b of the negative electrode insulating member 80 do not abut on the electrode bodies 20a, 20b, and 20c.

Although some embodiments of the present invention have been described above, the above-described embodiments are merely examples. The present invention can be implemented in various other forms. The present invention can be implemented on the basis of the contents disclosed in the present specification and common general technical knowledge in the art. The techniques described in the claims include various modifications and changes of the embodiments illustrated above. For example, a portion of the above-described embodiment can also be replaced with another modification, and another modification can also be added to the above-described embodiment. When the technical feature is not described as essential, it can be deleted as appropriate.

Figure 13:
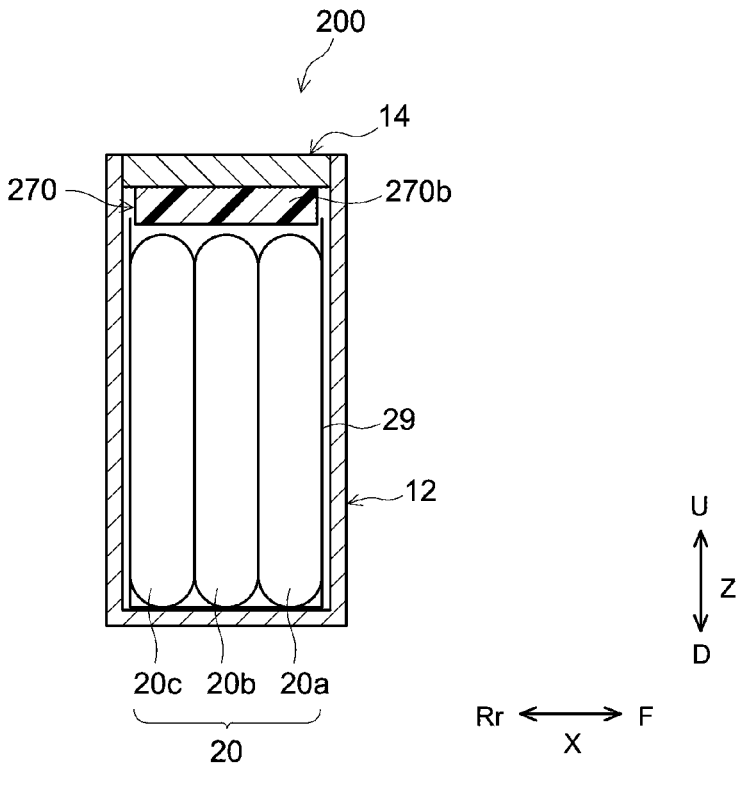
FIG. 13 is a diagram corresponding to FIG. 3 according to a second embodiment.

For example, in the above-described embodiment, the positive electrode insulating member 70 includes the plurality of protrusion portions 70b, and each of the protrusion portions 70b has a cross-section having substantially a U Shape. However, the present invention is not limited thereto. The number of protrusion portions 70b may be one. In addition, the protrusion portion 70h can be formed to have any shape, FIG. 13 is a diagram corresponding to FIG. 3 and shows a battery 200 according to a second embodiment. The battery 200 may be the same as the battery 100 except that a positive electrode insulating member 270 is included instead of the positive electrode insulating, member 70. The positive electrode insulating member 270 includes one protrusion portion 270b having a rectangular cross-section.

Figure 14:
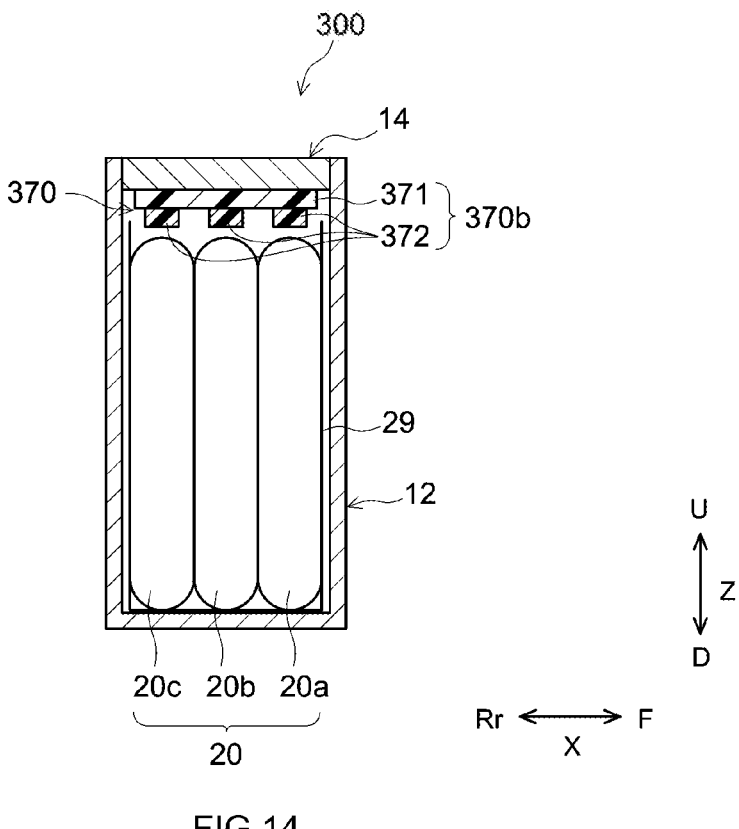
FIG. 14 is a diagram corresponding to FIG. 3 according to a third embodiment.

FIG. 14 is a diagram corresponding to FIG. 3 and shows a battery 300 according to a third embodiment. The battery 300 may be the same as the battery 100 except that a positive electrode insulating member 370 is included instead of the positive electrode insulating member 70. The positive electrode insulating member 370 includes a protrusion portion 370b having one rectangular portion 371 having a rectangular cross-section, and a plurality of protruding rib portions 372 protruding from the rectangular portion 371 to the electrode bodies 20a, 20b, and 20c sides.

Figure 15:
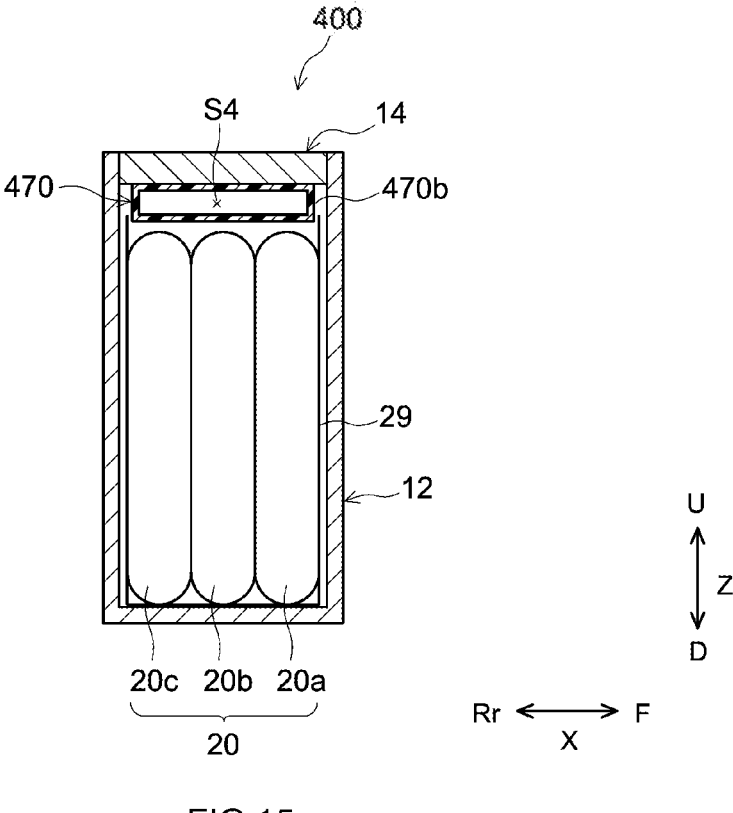
FIG. 15 is a diagram corresponding to FIG. 3 according to a fourth embodiment.

FIG. 15 is a diagram corresponding to FIG. 3 and shows a battery 400 according to a fourth embodiment. The battery 400 may be the same as the battery 100 except that a positive electrode insulating member 470 is included instead of the positive electrode insulating member 70. The positive electrode insulating member 470 includes a protrusion portion 470b having a square-shaped cross-section. The protrusion portion 470b is hollow, and a gas flow path space 84 is secured therein.

Figure 16:
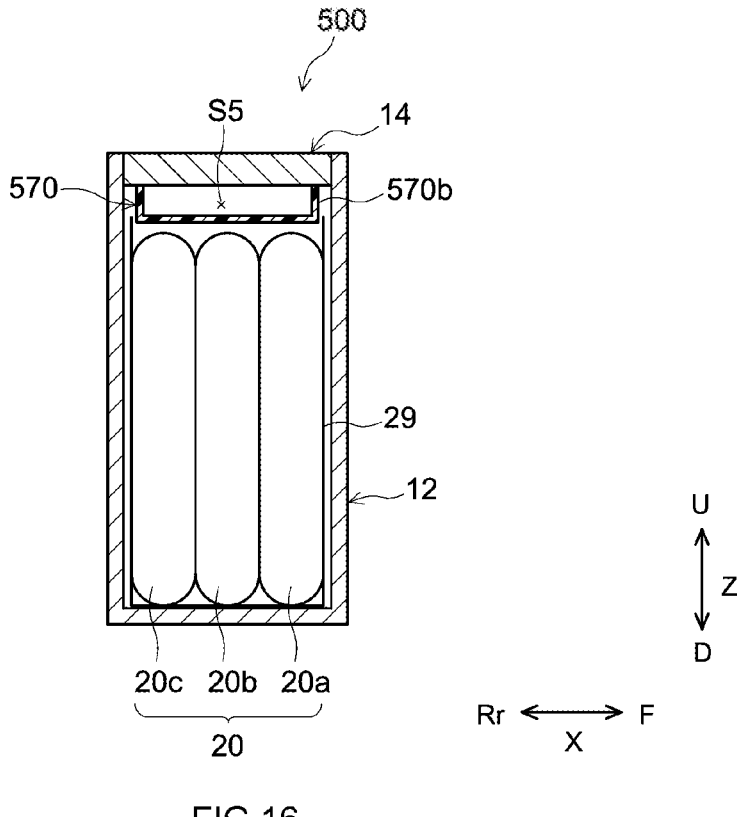
FIG. 16 is a diagram corresponding to FIG. 3 according to a fifth embodiment.

FIG. 16 is a diagram corresponding to FIG. 3 and shows a battery 500 according to a fifth embodiment. The battery 500 may be the same as the battery 100 except that a positive electrode insulating member 570 is included instead of the positive electrode insulating member 70. The positive electrode insulating member 570 includes a protrusion portion 570b having a U-shaped cross-section. The protrusion portion 570b is provided such that a U-Shaped opening faces the side of the sealing plate 14. The protrusion portion 570b is hollow, and a gas flow path space S5 is secured therein.

What is claimed is:

1. A battery comprising:
an exterior body that includes a bottom wall, a pair of first side walls extending from the bottom wall and facing each other, a pair of second side walls extending from the bottom wall and facing each other, and an opening facing the bottom wall;
a sealing plate that seals the opening of the exterior body;
electrode bodies that are accommodated in the exterior body and include a first electrode body and a second electrode body, wherein the first electrode body includes first and second electrodes and has a first curved outer surface, and the second electrode body includes first and second electrodes and has a second curved outer surface;
an electrode tab group that includes a plurality of tabs protruding at ends, in a first direction along the first side walls, of the electrode bodies and is electrically connected to one of the first electrode body or the second electrode body;
a terminal that is attached to the sealing plate and electrically connected to the electrode tab group;

an electrode collecting unit that electrically connects the electrode tab group and the terminal; and an insulating member that insulates the sealing plate and the electrode collecting unit from each other, wherein the electrode collecting unit includes an electrode first collecting unit and an electrode second collecting unit, the plurality of tabs are electrically connected to one of the electrode first collecting unit or the electrode second collecting unit in a bent and curved state, the insulating member includes a base portion that is disposed between the sealing plate and the electrode collecting unit, and a plurality of protrusion portions that are each provided closer to a center of the sealing plate in the first direction than the base portion and protrude from the sealing plate toward the electrode bodies, wherein:

the plurality of protrusion portions are each spaced from the center of one of the electrode bodies as measured in the first direction by a distance of 0.25 La or more wherein the length of the electrode body in the first direction is equal to La, the plurality of protrusion portions are arranged in a second direction intersecting the first direction, the plurality of protrusion portions includes a first protrusion portion and a second protrusion portion, with the first protrusion portion facing the first curved outer surface of the first electrode body and the second protrusion portion facing the second curved outer surface of the second electrode body, and each of the protrusion portions includes a pair of first vertical walls that extend in the first direction and protrude from the sealing plate toward a respective facing electrode body, a lower horizontal wall that extends in the first direction and connects ends of the pair of first vertical walls on a side facing the electrode body, a second vertical wall that connects ends of the pair of first vertical walls on the base portion side and an end of the lower horizontal wall on the base portion side to the base portion, each of the protrusion portions having an open end on a side opposite to the second vertical wall, and a space being defined between the pair of first vertical walls, the lower horizontal wall, and the sealing plate.

2. The battery according to claim 1, wherein the plurality of protrusion portions of the insulating member are disposed at positions apart from the electrode bodies.

3. The battery according to claim 1, wherein the electrode bodies are each a winding electrode body that is laminated in a state, where a first electrode having a band shape and a second electrode having a band shape are insulated from each other, and are wound around a winding axis, each winding electrode body is accommodated in the exterior body so that the winding axis is parallel to the first direction, and a shortest distance between each winding electrode body and the plurality of protrusion portions of the insulating member is 0.1 mm or more and within 5 mm.

4. The battery according to claim 1, wherein the insulating member includes an upper horizontal wall that extends in the first direction and connects ends of the first vertical walls of adjacent protrusion portions.

5. The battery according to claim 1, wherein the sealing plate is provided with a gas exhaust valve, and a gas flow path space which is surrounded by the first vertical wall of the plurality of protrusion portions and the electrode body and communicates with the gas exhaust valve is provided.

6. A method of manufacturing a battery including an exterior body that includes a bottom wall, a pair of first side walls extending from the bottom wall and facing each other, a pair of second side walls extending from the bottom wall and facing each other, and an opening facing the bottom wall, a sealing plate that seals the opening of the exterior body, electrode bodies that are accommodated in the exterior body and include a first electrode body and a second electrode body, wherein the first electrode body includes first and second electrodes and has a first curved outer surface, and the second electrode body includes first and second electrodes and has a second curved outer surface, an electrode tab group that includes a plurality of tabs protruding at ends, in a first direction along the first side walls, of the electrode bodies and is electrically connected to one of the first electrode body or the second electrode body, a terminal that is attached to the sealing plate and electrically connected to the electrode tab group, an electrode collecting unit that electrically connects the electrode tab group and the terminal, and an insulating member that insulates the sealing plate and the electrode collecting unit from each other, wherein the electrode collecting unit includes an electrode first collecting unit and an electrode second collecting unit, the plurality of tabs are electrically connected to one of the electrode first collecting unit or the electrode second collecting unit in a bent and curved state, and the insulating member includes a base portion that is disposed between the sealing plate and the electrode first collecting unit, and protrusion portions that are each provided closer to a center of the sealing plate in the first direction than the base portion and protrude from the sealing plate toward the electrode bodies, wherein:

the protrusion portions are each spaced from the center of one of the electrode bodies as measured in the first direction by a distance of 0.25 La or more wherein the length of the electrode body in the first direction is equal to La, the protrusion portions are arranged in a second direction intersecting the first direction, the protrusion portions include a first protrusion portion and a second protrusion portion, with the first protrusion portion facing the first curved outer surface of the first electrode body and the second protrusion portion facing the second curved outer surface of the second electrode body, and each of the protrusion portions includes a pair of first vertical walls that extend in the first direction and protrude from the sealing plate toward a facing electrode body, a lower horizontal wall that extends in the first direction and connects ends of the pair of first vertical walls on a side facing the electrode body, a second vertical wall that connects ends of the pair of first vertical walls on the base portion side and an end of the lower horizontal wall on the base portion side to the base portion, each of the protrusion portions having an open end on a side opposite to the second vertical wall, and a space being defined between the pair of first vertical walls, the lower horizontal wall, and the sealing plate, the method comprising:

a push-in step for pushing the electrode bodies into the exterior body with the protrusion portions, wherein the exterior body is arranged such that one of the pair of first side walls is located above the other of the pair of first side walls in a direction of gravity; and a sealing step for sealing the opening of the exterior body with the sealing plate.

7. The method of manufacturing a battery according to claim 6, wherein, after the sealing step is performed, the protrusion portions are disposed at positions apart from the electrode bodies.

8. The method of manufacturing a battery according to claim 6, wherein, after the sealing step is performed, a shortest distance between the electrode bodies and the protrusion portions is 0.1 mm or more and within 5 mm.

9. The battery according to claim 1, wherein the base portion includes a pair of long side walls provided at both ends in a short side direction and extending in a band shape in a long side direction, a short side wall provided at one end in the long side direction and extending in a band shape in the short side direction, and a pair of convex portions disposed at an inner peripheral edge of the pair of long side walls and provided to hold the electrode first collecting unit therebetween in the short side direction.

10. The battery according to claim 1, wherein the plurality of positive electrode tabs are provided at intervals in a longitudinal direction of the first electrode body.

11. The method of manufacturing a battery according to claim 6, wherein, the plurality of positive electrode tabs are provided at intervals in a longitudinal direction of the first electrode body.

12. The method of manufacturing a battery according to claim 6, wherein, during the push-in step, the electrode bodies are pressed by at least one of the protrusion portions and pushed into the exterior body.

13. The method of manufacturing a battery according to claim 12, wherein, after the electrode bodies are pushed into the exterior body, the protrusion portions and the electrode bodies are arranged at positions separated from each other.

14. The battery according to claim 1, wherein the plurality of tabs is each electrically connected to a surface of the electrode second collecting unit on an electrode body side of a region arranged along one of the second side walls.

15. The battery according to claim 1, wherein the plurality of tabs of the electrode tab group connected by one of the electrode first collecting unit and the electrode second collecting unit to one of the first electrode body or the second electrode body are all bent and curved in a same direction.

16. The battery according to claim 1, wherein the pair of first vertical walls are formed in a tapered shape so that a spacing between the pair of first vertical walls becomes smaller toward the one of the electrode bodies.

17. A battery comprising:

an exterior body that includes a bottom wall, a pair of first side walls extending from the bottom wall and facing each other, a pair of second side walls extending from the bottom wall and facing each other, and an opening facing the bottom wall;

a sealing plate that seals the opening of the exterior body;

a first electrode body and a second electrode body that are accommodated in the exterior body, wherein the first electrode body includes first and second electrodes and has a first curved outer surface, and the second electrode body includes first and second electrodes and has a second curved outer surface;

an electrode tab group that includes a plurality of tabs protruding at ends, in a first direction along the first side walls, of the first electrode body and is electrically connected to one of the first or second electrodes of the first electrode body;

a terminal that is attached to the sealing plate and electrically connected to the electrode tab group;

an electrode collecting unit that electrically connects the electrode tab group and the terminal; and an insulating member that insulates the sealing plate and the electrode collecting unit from each other, wherein the plurality of tabs are electrically connected to the electrode collecting unit in a bent and curved state, the insulating member includes a base portion that is disposed between the sealing plate and the electrode collecting unit, and a plurality of protrusion portions that are each provided closer to a center of the sealing plate in the first direction than the base portion and protrude from the sealing plate toward the first electrode body or the second electrode body, wherein:

the plurality of protrusion portions are arranged in a second direction intersecting the first direction, the plurality of protrusion portions includes a first protrusion portion and a second protrusion portion, with the first protrusion portion facing the first curved outer surface of the first electrode body and the second protrusion portion facing the second curved outer surface of the second electrode body, and each of the protrusion portions includes a pair of first vertical walls that extend in the first direction and protrude from the sealing plate toward a facing electrode body, a lower horizontal wall that extends in the first direction and connects ends of the pair of first vertical walls on a side facing the electrode body, a second vertical wall that connects ends of the pair of first vertical walls on the base portion side and an end of the lower horizontal wall on the base portion side to the base portion, each of the protrusion portions having an open end on a side opposite to the second vertical wall, and a space being defined between the pair of first vertical walls, the lower horizontal wall, and the sealing plate.

* * * * *